(12) United States Patent
Oi et al.

(10) Patent No.: US 8,457,804 B2
(45) Date of Patent: Jun. 4, 2013

(54) SYSTEM STABILIZING DEVICE

(75) Inventors: Kazunobu Oi, Tokyo (JP); Masakazu Muneshima, Tokyo (JP); Takahiro Murai, Tokyo (JP)

(73) Assignee: Meidensha Corporation, Tokyo (JP)

( * ) Notice: Subject to any disclaimer, the term of this patent is extended or adjusted under 35 U.S.C. 154(b) by 331 days.

(21) Appl. No.: 12/990,613

(22) PCT Filed: May 8, 2009

(86) PCT No.: PCT/JP2009/058701
§ 371 (c)(1),
(2), (4) Date: Jan. 11, 2011

(87) PCT Pub. No.: WO2009/136639
PCT Pub. Date: Nov. 12, 2009

(65) Prior Publication Data
US 2011/0118887 A1    May 19, 2011

(30) Foreign Application Priority Data
May 9, 2008   (JP) .................. 2008-123039

(51) Int. Cl.
*G05D 17/00*   (2006.01)
(52) U.S. Cl.
USPC ................. 700/293; 322/11; 322/19
(58) Field of Classification Search
USPC .............. 322/11, 19; 363/15; 700/293; 703/2
See application file for complete search history.

(56) References Cited

U.S. PATENT DOCUMENTS

| | | | |
|---|---|---|---|
| 6,337,561 B1 * | 1/2002 | Sudou et al. | 322/19 |
| 6,545,885 B2 * | 4/2003 | Nishimura et al. | 363/39 |
| 7,663,348 B2 * | 2/2010 | Oohara et al. | 322/24 |
| 2007/0097565 A1 | 5/2007 | Oohara et al. | |

FOREIGN PATENT DOCUMENTS

| | | |
|---|---|---|
| JP | 10-014251 | 1/1998 |
| JP | 2007-124779 | 5/2007 |
| JP | 2007-236085 | 9/2007 |
| JP | 2008-043151 | 2/2008 |

OTHER PUBLICATIONS

International Search Report in corresponding PCT/JP2009/058701.

* cited by examiner

*Primary Examiner* — Shahid Alam
*Assistant Examiner* — Ziaul Karim
(74) *Attorney, Agent, or Firm* — Foley & Lardner LLP

(57) ABSTRACT

A control unit of a system stabilizing device uses a fluctuation detecting block (70A) to determine fluctuation components included in the active component and reactive component currents of a system current. The fluctuation detecting block (70A) is composed of a low-pass filter (71) for noise removal having first order lag characteristics with a time constant of T1, a low-pass filter (72) for setting a fluctuation detection time having first order lag characteristics with a time constant of T2, a subtracter (73) which performs subtraction between the output signals of the filter (71) and the filter (72) and outputs the difference, an amplifier (74) for amplifying the output of the subtracter (73), a rating limiter (75) for limiting the output of the amplifier, and an overcompensation inhibiting unit (200) which changes T4 to a smaller value when the rating limiter (75) performs a limiter action.

6 Claims, 18 Drawing Sheets

SYSTEM STABILIZING DEVICE

TECHNICAL FIELD

This invention relates to a system stabilizing device, which is designed to prevent an overcompensating action even if a load change or fluctuation exceeds the rating.

BACKGROUND ART

In recent years, power generation by natural energy such as sunlight or wind power has found use.

FIG. 15 shows an example in which an existing power system (a system superior to a distribution system) 1 and a distribution system (micro grid) 10 are connected via a line impedance Ls and a circuit breaker 2.

A dispersed generation plant 11 and a load 12 are connected to the distribution system 10 which is the micro grid. The dispersed generation plant 11 is illustrated as a single generator in FIG. 15. Actually, however, it is composed of a plurality of dispersed facilities for power generation, which include natural energy type power generation equipment utilizing natural energy (e.g., photovoltaic power generation equipment or wind power generation equipment), and internal combustion engine type power generation equipment driven by an internal combustion engine (e.g., diesel power generation equipment). Also, the load 12 is actually a plurality of dispersed loads.

With the micro grid 10 as shown in FIG. 15, the amount of power generation varies or fluctuates greatly according to weather conditions, wind speed, etc., because it has natural energy type power generation equipment.

In order to absorb or accommodate such fluctuations in the amount of power generation, therefore, a system stabilizing device is used.

With the internal combustion engine type power generation equipment, output power is adjusted by governor control. However, governor control is slow in response. Thus, if electric power consumed by the load 12 suddenly changes, the internal combustion engine type power generation equipment cannot follow such a sudden change (sudden excess or deficiency) in electric power.

The system stabilizing device is also used for the purpose of following such a sudden change in electric power with good response, thereby assisting the internal combustion engine type power generation equipment to balance demand for and supply of electric power.

The system stabilizing device is a power converter having a power storage function, and it is also a device installed in the distribution system to make the aforementioned power compensation.

FIG. 16 shows an example in which a system stabilizing device 20 is provided in the distribution system (micro grid) 10 shown in FIG. 15. The system stabilizing device 20 is connected in parallel with the dispersed generation plant 11 and the load 12.

The system stabilizing device 20 has a control unit 21, a power converter 22 (inverter) capable of an inverting action and a converting or rectifying action, and a direct current charging unit 23, such as an electric double layer capacitor or a storage battery (battery), as main members.

The power converter 22 acts responsive to a gate signal g fed from the control unit 21. This power converter 22, when performing a converting action, converts an alternating current (AC) power obtained from the distribution system 10 into a direct current (DC) power, and charges this DC power into the direct current charging unit 23. When performing an inverting action, the power converter 22 converts the DC power charged in the direct current charging unit 23 into an AC power, and sends this AC power to the distribution system 10.

The power outputted from the power converter (inverter) 22 is passed through a filter circuit 27, and sent out to the distribution system 10. That is, the power sent from the system stabilizing device 20 out to the distribution system 10 is the power outputted from the power converter 22 and then filtered by the filter circuit 27.

The filter circuit 27 is composed of a reactor, a capacitor and a transformer, and functions to smooth a pulse voltage outputted from the power converter 22.

In the system stabilizing device 20, a system current Is, which flows from the power system 1 into the distribution system 10, is detected by a current detector 24, a system voltage Vs which is the voltage of the distribution system 10 is detected by a voltage detector 25, and a converter current $I_{INV}$ inputted to and outputted from the power converter 22 is detected by a current detector 26. Moreover, a current detector AA for detecting a current fed out of the system stabilizing device 20 to the distribution system 10 is provided for reasons to be described later.

Under normal conditions where no breakdown or the like occurs in the power system 1, the circuit breaker 2 is in a connected state, so that "a system-interconnected run", an operation performed with the distribution system 10 being tied to the power system 1, is performed in the system stabilizing device 20. During the system-interconnected run, electric power is supplied to the load 12 by the power system 1, the dispersed generation plant 11, and the system stabilizing device 20.

Under abnormal conditions where a breakdown occurs in the power system 1, on the other hand, the circuit breaker 2 is in a cut-off state, and the system stabilizing device 20 makes a "self-supporting or isolated run", an operation performed with the distribution system 10 being cut off from the power system 1. During the self-supporting run, electric power is supplied to the load 12 by the dispersed generation plant 11 and the system stabilizing device 20.

The system stabilizing device 20 performs the following actions during the system-interconnected run and the self-supporting run:

(1) During the system-interconnected run, the system stabilizing device 20 acts to detect the system current Is flowing into the distribution system 10, determine a system power from the system current Is, and suppress fluctuations in this system power.

(2) During the self-supporting run, the system stabilizing device 20 detects the system voltage Vs within the distribution system 10, and performs a compensating action so that the voltage amplitude and frequency of this system voltage Vs become stable.

Details of the control unit 21 of the system stabilizing device 20 will be described by reference to FIG. 17.

A phase-locked loop (PLL) 101 outputs a reference phase signal θ showing the phase of the system voltage Vs based on the system voltage Vs. A sine wave generator 102 outputs a three-phase voltage waveform {sin(θ), sin(θ−2/3π), sin(θ+2/3π)}, corresponding to a rated voltage synchronized to the reference phase signal θ, as a reference three-phase sine wave signal K.

A change-over switch 103, during the system-interconnected run, has movable contacts 103a, 103b thrown to the A side as indicated by solid lines in the drawing and, during the self-supporting run, has the movable contacts 103a, 103b thrown to the B side as indicated by dashed lines in the drawing.

Next, explanations will be offered for the respective functional blocks working during the system-interconnected run, and for their control actions during the system-interconnected run.

A dq transformation unit 104 dq-transforms the system current Is to a rotating coordinate system rotating in a phase indicated by the reference phase signal θ to output the active component $Is_d$ of the system current and the reactive component $Is_q$ of the system current.

A first fluctuation detecting block 105 detects the fluctuation component of the active component $Is_d$ of the system current on the dq-axes, and outputs it as a current command $I_{refd}$ for the active component. A second fluctuation detecting block 106 detects the fluctuation component of the reactive component $Is_q$ of the system current on the dq-axes, and outputs it as a current command $I_{refq}$ for the reactive component.

The fluctuation detecting blocks 105, 106 are band-pass filters having a differentiation function and a filter function, and details of their structures will be described later.

A dq transformation unit 107 dq-transforms the converter current $I_{INV}$ to a rotating coordinate system rotating in a phase indicated by the reference phase signal θ to output the active component $I_{invd}$ of the converter current and the reactive component $I_{invq}$ of the converter current.

A subtraction unit 108 subtracts the active component $I_{invd}$ of the converter current from the current command $I_{refd}$ for the active component to output a current deviation Δd for the active component. A subtraction unit 109 subtracts the reactive component $I_{invq}$ of the converter current from the current command $I_{refq}$ for the reactive component to output a current deviation Δq for the reactive component.

A current control unit 110 exercises the proportional plus integral (PI) control of the current deviation Δd for the active component to output a voltage command Vd for the active component. A current control unit 111 exercises the proportional plus integral (PI) control of the current deviation Δq for the reactive component to output a voltage command Vq for the reactive component.

A dq inverse transformer unit 112 applies dq inverse transformation to the voltage command Vd for the active component and the voltage command Vq for the reactive component to output a voltage command Vφ of a fixed coordinate system.

An addition unit 113 adds the reference three-phase sine wave signal K to the voltage command Vφ to output a final voltage command V*.

A PWM (pulse width modulation) modulator 114 PWM-modulates the voltage command V* to output the gate signal g.

In accordance with this gate signal g, action control over the power converter 22 is effected. To suppress fluctuations in the system current Is during the system-interconnected run, power is outputted from the power converter 22.

Next, explanations will be offered for the respective functional blocks working during the self-supporting run, and for their control actions during the self-supporting run.

A frequency detection unit 121 detects the frequency of the system voltage Vs to output a frequency signal F. The frequency of the system voltage Vs corresponds to the active power, and is in a corresponding relationship with the active power such that when the active power decreases, the frequency of the system voltage Vs decreases, and when the active power increases, the frequency of the system voltage Vs increases.

An amplitude detection unit 122 detects the amplitude of the system voltage Vs to output an amplitude signal L. The amplitude of the system voltage Vs corresponds to the reactive power, and is in a corresponding relationship with the reactive power such that when the reactive power decreases, the amplitude of the system voltage Vs decreases, and when the reactive power increases, the amplitude of the system voltage Vs increases.

A third fluctuation detecting block 123 detects the fluctuation component of the frequency signal F, and outputs it as a current command $I_{refd}$ for the active component. A fourth fluctuation detecting block 124 detects the fluctuation component of the amplitude signal L, and outputs it as a current command $I_{refq}$ for the reactive component.

The fluctuation detecting blocks 123, 124 are band-pass filters having a differentiation function and a filter function, and details of their structures will be described later.

The subtraction unit 108 subtracts the active component $I_{invd}$ of the converter current from the current command $I_{refd}$ for the active component to output a current deviation Δd for the active component. The subtraction unit 109 subtracts the reactive component $I_{invq}$ of the converter current from the current command $I_{refq}$ for the reactive component to output a current deviation Δq for the reactive component.

The current control unit 110 exercises the proportional plus integral (PI) control of the current deviation Δd for the active component to output a voltage command Vd for the active component. The current control unit 111 exercises the proportional plus integral (PI) control of the current deviation Δq for the reactive component to output a voltage command Vq for the reactive component.

The dq inverse transformer unit 112 applies dq inverse transformation to the voltage command Vd for the active component and the voltage command Vq for the reactive component to output a voltage command Vφ of a fixed coordinate system.

The addition unit 113 adds the reference three-phase sine wave signal K to the voltage command Vφ to output a final voltage command V*.

The PWM (pulse width modulation) modulator 114 PWM-modulates the voltage command V* to output the gate signal g.

In accordance with this gate signal g, action control over the power converter 22 is effected. To suppress fluctuations in the voltage amplitude and frequency of the system voltage Vs during the self-supporting run, power is outputted from the power converter 22.

The fluctuation detecting blocks 105, 106, 123, 124 are composed of the band-pass filters, as stated above.

The configuration of a conventional band-pass filter 50, which can be used as the fluctuation detecting blocks 105, 106, 123, 124, will be described by reference to FIG. 18. In FIG. 18, the symbol s denotes a Laplace operator showing a differentiation function.

As shown in FIG. 18, this band-pass filter (fluctuation detecting block) 50 is composed of a low-pass filter 51, a low-pass filter 52, and a subtracter 53.

The pass band frequency of the band-pass filter 50 is determined in accordance with filtering characteristics required of the respective fluctuation detecting blocks 105, 106, 123, 124. The cut-off frequency on the high frequency side of the determined pass band frequency is set to be f1, and the cut-off frequency on the low frequency side of the determined pass band frequency is set to be f2. The time constant of the low-pass filter 51 for noise removal, which has a cut-off frequency set at f1, is T1. The time constant of the low-pass filter 52 for setting the fluctuation detection time, which has a cut-off frequency set at f2, is T2.

The low-pass filter 51 is a filter having first order lag characteristics whose time constant is set to be the time constant T1 determined for the purpose of noise removal.

The low-pass filter 52 is a filter having first order lag characteristics whose time constant is set to be the time constant T2 determined for the purpose of setting the time for detecting fluctuations.

Upon entry of an input signal, both filters 51 and 52 utilize their filtering characteristics to filter the input signal.

The input signal is the active component $Is_d$ of the system current, if the band-pass filter (fluctuation detecting block) 50 is the fluctuation detecting block 105. The input signal is the reactive component $Is_q$ of the system current, if the band-pass filter (fluctuation detecting block) 50 is the fluctuation detecting block 106. The input signal is the frequency signal F, if the band-pass filter (fluctuation detecting block) 50 is the fluctuation detecting block 123. The input signal is the amplitude signal L, if the band-pass filter (fluctuation detecting block) 50 is the fluctuation detecting block 124.

The subtracter 53 outputs a signal obtained by subtracting the output signal of the low-pass filter 52 from the output signal of the low-pass filter 51. The signal outputted from the subtracter 53 is a fluctuation component signal.

This fluctuation component signal is the current command $I_{refd}$ for the active component which is the fluctuation component of the active component $Is_d$ of the system current, if the band-pass filter (fluctuation detecting block) 50 is the fluctuation detecting block 105. The fluctuation component signal is the current command $I_{refq}$ for the reactive component which is the fluctuation component of the reactive component $Is_q$ of the system current, if the band-pass filter (fluctuation detecting block) 50 is the fluctuation detecting block 106. The fluctuation component signal is the current command $I_{refd}$ for the active component which is the fluctuation component of the frequency signal F, if the band-pass filter (fluctuation detecting block) 50 is the fluctuation detecting block 123. The fluctuation component signal is the current command $I_{refq}$ for the reactive component which is the fluctuation component of the amplitude signal L, if the band-pass filter (fluctuation detecting block) 50 is the fluctuation detecting block 124.

PRIOR ART DOCUMENT

Patent Document

Patent Document 1: JP-A-10-14251

SUMMARY OF THE INVENTION

Problems to be Solved by the Invention

The above-mentioned conventional technologies have been confronted with the following problems:

During the system-interconnected run, the system stabilizing device 20 works to have the power converter 22 deliver power, thereby making power compensation, in order to suppress fluctuations in the system current Is. As a result, the detected value of the system current Is detected next time is decreased by an amount corresponding to the current outputted for power compensation from the power converter 22. Such a decrease in the detected value of the system current Is makes it impossible to suppress fluctuations in the system current Is reliably.

To prevent this drawback, it is conceivable to detect the current fed out from the system stabilizing device 20 to the distribution system 10, namely, the output current outputted from the power converter 22, filtered by the filter circuit 27, and then fed out to the distribution system 10, and add the detected value of this output current to the detected value of the system current, thereby canceling out the decrease in the detected value of the system current.

In this case, however, the problem arises that the current detector AA for detecting the current delivered from the system stabilizing device 20 to the distribution system 10 (the current after passage through the filter circuit 27) is separately required.

To prevent the above drawback, another idea is to equip the output side of the fluctuation detecting blocks 105, 106 with a proportional plus integral (PI) amplifier to amplify the current commands $I_{refd}$, $I_{refq}$, thereby canceling out the decrease in the detected value of the system current. This idea poses the problem of the separate need for the PI amplifier for amplifying the current commands $I_{refd}$, $I_{refq}$.

Furthermore, the PI amplifier is characterized in that a gain on the direct current component of the input signal becomes infinite. Even if the fluctuation component is zero, therefore, the output of the PI amplifier is not reduced to zero, so that the power continues to be outputted from the system stabilizing device 20. To eliminate this shortcoming, the PI amplifier needs to be reset.

However, an abrupt reset results in a sudden change of the power outputted from the system stabilizing device 20 to zero, thereby adversely affecting the system, etc. In this view, complicated control which involves returning the output of the PI amplifier to zero little by little, instead of such a simple reset, is needed. This is another problem.

During the self-supporting run, the system stabilizing device 20 works to have the power converter 22 deliver power, thereby making power compensation, in order to suppress fluctuations in the frequency and amplitude of the system voltage Vs. As a result, the detected value of the frequency or the detected value of the amplitude of the system voltage Vs detected next time is decreased by an amount corresponding to the current outputted for power compensation from the power converter 22. Such a decrease in the detected value of the frequency or the detected value of the amplitude of the system voltage Vs makes it impossible to suppress fluctuations in the system voltage Vs reliably.

As described above, therefore, it is conceivable to detect the current fed out from the system stabilizing device 20 to the distribution system 10, namely, the output current outputted from the power converter 22, filtered by the filter circuit 27, and then fed out to the distribution system 10, and add the detected value of this output current to the detected value of the frequency or the detected value of the amplitude of the system voltage; or to provide a PI amplifier. These measures, however, arouse the same problems as stated above.

Besides, no contrivance to prevent an overcompensating action even when the load fluctuation exceeds the rating has been worked out.

The present invention has been accomplished in the light of the above-described conventional technologies. It is an object of the invention to provide a system stabilizing device capable of performing stable actions even when load fluctuations exceed the rating, without using a current detector for detecting the output current of the system stabilizing device, or using a PI amplifier.

Means for Solving the Problems

A constitution of the present invention for solving the above problems is a system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detecting block, and uses the fluctuation component as a current command for the active component;

determines a fluctuation component included in the reactive component of the system current by a second fluctuation detecting block, and uses the fluctuation component as a current command for the reactive component;

further determines an active component of a converter current and a reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detecting block, and uses the fluctuation component as a current command for an active component;

determines a fluctuation component included in the amplitude signal by a fourth fluctuation detecting block, and uses the fluctuation component as a current command for a reactive component;

further determines the active component of the converter current and the reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when a cut-off frequency on a high frequency side of a pass band frequency of the fluctuation detecting block is set to be f1, a cut-off frequency on a low frequency side of the pass band frequency is set to be f2, a time constant of a low-pass filter for noise removal which has a cut-off frequency of f1 set to be T1, a time constant of a low-pass filter for setting a fluctuation detection time which has a cut-off frequency of f2 is set to be T2, $\zeta$ is set as an oscillation coefficient, $\alpha$ is set as a setting number, G is set as a gain, a value obtained by multiplying T1 by $\alpha$ is set to be T3, and a value obtained by dividing T2 by $\alpha$ is set to be T4, the first to fourth fluctuation detecting blocks are each composed of a first filter having first order lag characteristics with a time constant of T3; a second filter having first order lag characteristics with a time constant of T4; a subtracter which performs subtraction between a signal outputted from the first filter and a signal outputted from the second filter and outputs a resulting difference; an amplifier for multiplying an output of the subtracter by the gain G, and outputting a resulting product; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to the rated value and then allows the amplification signal to pass; and an overcompensation inhibiting unit, the oscillation coefficient $\zeta$ expressed by Formula (01) is set at a value larger than 1, and the setting number $\alpha$ and the gain G are set using the Formula (01), Formula (02) and Formula (03), and if a state where the signal value of the amplification signal is restricted to the rated value by the rating limiter continues for a time equal to or longer than a preset constant time, the overcompensation inhibiting unit changes the time constant of the second filter to a value smaller than T4, but if a state where the amplification signal passes unchanged through the rating limiter is reached, the overcompensation inhibiting unit returns the time constant of the second filter to T4.

[1st mathematical formulas]

$$\zeta = \frac{T1 \cdot \alpha + \frac{T2}{\alpha}}{2\sqrt{T1 T2}} \quad (01)$$

$$\alpha = \frac{2\sqrt{T1 T2} \cdot \xi \pm \sqrt{4T1 \cdot T2 \cdot \xi^2 - 4T1 \cdot T2}}{2T1} \quad (02)$$

$$G = \frac{\alpha(T2 - T1)}{T2 - \alpha^2 T1} \quad (03)$$

Another constitution of the present invention is a system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detecting block, and uses the fluctuation component as a current command for the active component;

determines a fluctuation component included in the reactive component of the system current by a second fluctuation detecting block, and uses the fluctuation component as a current command for the reactive component;

further determines an active component of a converter current and a reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detecting block, and uses the fluctuation component as a current command for an active component;

determines a fluctuation component included in the amplitude signal by a fourth fluctuation detecting block, and uses the fluctuation component as a current command for a reactive component;

further determines the active component of the converter current and the reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when a cut-off frequency on a high frequency side of a pass band frequency of the fluctuation detecting block is set to be f1, a cut-off frequency on a low frequency side of the pass band frequency is set to be f2, a time constant of a low-pass filter for noise removal which has a cut-off frequency of f1 is set to be T1, a time constant of a low-pass filter for setting a fluctuation detection time which has a cut-off frequency of f2 is set to be T2, $\zeta$ is set as an oscillation coefficient, $\alpha$ is set as a setting number, G is set as a gain, a value obtained by multiplying T1 by $\alpha$ is set to be T3, and a value obtained by dividing T2 by $\alpha$ is set to be T4, the first to fourth fluctuation detecting blocks are each composed of a first filter having first order lag characteristics with a time constant of T3; a second filter having first order lag characteristics with a time constant of T4; a subtracter which performs subtraction between a signal outputted from the first filter and a signal outputted from the second filter and outputs a resulting difference; an amplifier for multiplying an output of the subtracter by the gain G, and outputting a resulting product; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to the rated value and then allows the amplification signal to pass; and an overcompensation inhibiting unit, the gain G is set at an arbitrary value, the setting number $\alpha$ is set using Formula (04), and the oscillation coefficient $\zeta$ is set at $\zeta=[T1\cdot\alpha+(T2/\alpha)]/[2(T1\cdot T2)^{1/2}]$, and if a state where the signal value of the amplification signal is restricted to the rated value by the rating limiter continues for a time equal to or longer than a preset constant time, the overcompensation inhibiting unit changes the time constant of the second filter to a value smaller than T4, but if a state where the amplification signal passes unchanged through the rating limiter is reached, the overcompensation inhibiting unit returns the time constant of the second filter to T4.

[2nd mathematical formula]

$$\alpha = \frac{-(T2-T1) \pm \sqrt{(T2-T1)^2 + 4G^2 \cdot T1 \cdot T2}}{2T1 \cdot G} \quad (04)$$

Another constitution of the present invention is the above system stabilizing device, wherein in each of the first to fourth fluctuation detecting blocks, the cut-off frequency on the high frequency side of the pass band frequency of the fluctuation detecting block is set as f1, the cut-off frequency on the low frequency side of the pass band frequency is set as f2, the time constant for noise removal with a value of 1/f1 is set as T1, the time constant for setting the fluctuation detection time with a value of 1/f2 is set as T2, the oscillation coefficient is set as $\zeta$, the setting number is set as $\alpha$, the gain is set as G, the value obtained by multiplying T1 by $\alpha$ is set as T3, and the value obtained by dividing T2 by $\alpha$ is set as T4, and the first to fourth fluctuation detecting blocks each perform computations with use of computing programs to carry out first order lag filtering of the input signal inputted to the fluctuation detecting block, with a time constant as T3, to determine a first filter signal, carry out first order lag filtering of the input signal inputted to the fluctuation detecting block, with a time constant as T4, to determine a second filter signal, subtract the second filter signal from the first filter signal to determine a subtraction signal, multiply the subtraction signal by the gain G to determine an amplification signal, when the amplification signal is smaller than a predetermined rated value, determine the amplification signal as a fluctuation component, but when the amplification signal is equal to or larger than the predetermined rated value, restrict the amplification signal to the rated value, determine the restricted signal as a fluctuation component, and output the determined fluctuation component as a current command, and if a state where a signal value of the amplification signal is restricted to the rated value continues for a time equal to or longer than a predetermined constant time, change the time constant of the second filter to a value smaller than T4, but if a state where the signal value of the amplification signal is smaller than the rated value is reached, return the time constant of the second filter to T4.

Another constitution of the present invention is a system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detecting block, and uses the fluctuation component as a current command for the active component;

determines a fluctuation component included in the reactive component of the system current by a second fluctuation detecting block, and uses the fluctuation component as a current command for the reactive component;

further determines an active component of a converter current and a reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detecting block, and uses the fluctuation component as a current command for an active component;

determines a fluctuation component included in the amplitude signal by a fourth fluctuation detecting block, and uses the fluctuation component as a current command for a reactive component;

further determines the active component of the converter current and the reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when a cut-off frequency on a high frequency side of a pass band frequency of the fluctuation detecting block is set to be f1, a time constant of a low-pass filter for noise removal which has a cut-off frequency of f1 is set to be T1, ζ is set as an oscillation coefficient, α is set as a setting number, G is set as a gain, a value obtained by multiplying T1 by α is set to be T3, a cushioning time set at an arbitrary time is set to be T5, one sampling period is set to be Ts, and X is set as a limiting value, the first to fourth fluctuation detecting blocks each have a filter having first order lag characteristics with a time constant of T3; a limiter having limiting characteristics defined as ±(X/T5)Ts; a delay circuit for delaying an inputted signal by one sampling period Ts and outputting the delayed signal; a first subtracter; a second subtracter; an adder; an amplifier; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to the rated value and then allows the amplification signal to pass; and an overcompensation inhibiting unit, the first subtracter subtracts a signal outputted from the delay circuit from a signal outputted from the filter having the first order lag characteristics, and feeds a resulting difference to the limiter, the adder adds a signal outputted from the limiter and the signal outputted from the delay circuit, and outputs a resulting sum, the delay circuit delays the signal outputted from the adder by one sampling period Ts, and outputs the delayed signal, the second subtracter subtracts the signal outputted from the adder from the signal outputted from the filter having the first order lag characteristics, and outputs a resulting difference to the amplifier, the amplifier multiplies the output of the adder by the gain G, and outputs a resulting product, and the oscillation coefficient ζ expressed by Formula (01) is set at a value larger than 1, and the setting number α and the gain G are set using the Formula (01), Formula (02) and Formula (03), and if a state where the signal value of the amplification signal is restricted to the rated value by the rating limiter continues for a time equal to or longer than a predetermined constant time, the overcompensation inhibiting unit changes the cushioning time of the limiter to a value smaller than T5, but if a state where the amplification signal passes unchanged through the rating limiter is reached, the overcompensation inhibiting unit returns the cushioning time of the limiter to T5.

[3rd mathematical formulas]

$$\zeta = \frac{T1 \cdot \alpha + \frac{T2}{\alpha}}{2\sqrt{T1T2}} \quad (01)$$

$$\alpha = \frac{2\sqrt{T1T2} \cdot \xi \pm \sqrt{4T1 \cdot T2 \cdot \xi^2 - 4T1 \cdot T2}}{2T1} \quad (02)$$

$$G = \frac{\alpha(T2 - T1)}{T2 - \alpha^2 T1} \quad (03)$$

Another constitution of the present invention is a system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detecting block, and uses the fluctuation component as a current command for the active component;

determines a fluctuation component included in the reactive component of the system current by a second fluctuation detecting block, and uses the fluctuation component as a current command for the reactive component;

further determines an active component of a converter current and a reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detecting block, and uses the fluctuation component as a current command for an active component;

determines a fluctuation component included in the amplitude signal by a fourth fluctuation detecting block, and uses the fluctuation component as a current command for a reactive component;

further determines the active component of the converter current and the reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when a cut-off frequency on a high frequency side of a pass band frequency of the fluctuation detecting block is set to be f1, a time constant of a low-pass filter for noise removal which has a cut-off frequency of f1 is set to be T1, $\zeta$ is set as an oscillation coefficient, $\alpha$ is set as a setting number, G is set as a gain, a value obtained by multiplying T1 by $\alpha$ is set to be T3, a cushioning time set at an arbitrary time is set to be T5, one sampling period is set to be Ts, and X is set as a limiting value, the first to fourth fluctuation detecting blocks each have a filter having first order lag characteristics with a time constant of T3; a limiter having limiting characteristics defined as ±(X/T5)Ts; a delay circuit for delaying an inputted signal by one sampling period Ts and outputting the delayed signal; a first subtracter; a second subtracter; an adder; an amplifier; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to the rated value and then allows the amplification signal to pass; and an overcompensation inhibiting unit, the first subtracter subtracts a signal outputted from the delay circuit from a signal outputted from the filter having the first order lag characteristics, and feeds a resulting difference to the limiter, the adder adds a signal outputted from the limiter and the signal outputted from the delay circuit, and outputs a resulting sum, the delay circuit delays the signal outputted from the adder by one sampling period Ts, and outputs the delayed signal, the second subtracter subtracts the signal outputted from the adder from the signal outputted from the filter having the first order lag characteristics, and outputs a resulting difference to the amplifier, the amplifier multiplies the output of the adder by the gain G, and outputs a resulting product, and the gain G is set at an arbitrary value, the setting number $\alpha$ is set using Formula (04), and the oscillation coefficient $\zeta$ is set at $\zeta=[T1\cdot\alpha+(T2/\alpha)]/[2(T1\cdot T2)^{1/2}]$, and if a state where the signal value of the amplification signal is restricted to the rated value by the rating limiter continues for a time equal to or longer than a predetermined constant time, the overcompensation inhibiting unit changes the cushioning time of the limiter to a value smaller than T5, but if a state where the amplification signal passes unchanged through the rating limiter is reached, the overcompensation inhibiting unit returns the cushioning time of the limiter to T5:

[4th mathematical formula]

$$\alpha = \frac{-(T2-T1) \pm \sqrt{(T2-T1)^2 + 4G^2 \cdot T1 \cdot T2}}{2T1 \cdot G} \qquad (04)$$

Another constitution of the present invention is the above system stabilizing device, wherein in each of the first to fourth fluctuation detecting blocks, the cut-off frequency on the high frequency side of the pass band frequency of the fluctuation detecting block is set as f1, the time constant for noise removal with a value of 1/f1 is set as T1, the oscillation coefficient is set as $\zeta$, the setting number is set as $\alpha$, the gain is set as G, the value obtained by multiplying T1 by $\alpha$ is set as T3, the cushioning time set at the arbitrary time is set as T5, the one sampling period is set as Ts, and the limiting value is set as X, and the first to fourth fluctuation detecting blocks each perform computations with use of computing programs to carry out first order lag filtering of the input signal inputted to the fluctuation detecting block, with a time constant as T3, to determine a filter signal, subtract the delayed signal from the filter signal to determine a first subtraction signal, perform a limiting operation on the first subtraction signal by the limiting characteristics defined as ±(X/T5)Ts to determine a limit signal, add the limit signal and the delayed signal to determine an addition signal, delay the addition signal by the one sampling period Ts to form the delayed signal, subtract the addition signal from the filter signal to determine a second subtraction signal, and multiply the second subtraction signal by the gain G to determine an amplification signal, when the amplification signal is smaller than a predetermined rated value, determine the amplification signal as a fluctuation component, but when the amplification signal is equal to or larger than the predetermined rated value, restrict the amplification signal to the rated value, determine the restricted signal as a fluctuation component, and output the determined fluctuation component as a current command, and if a state where a signal value of the amplification signal is restricted to the rated value continues for a time equal to or longer than a predetermined constant time, change the cushioning time of the limiter to a value smaller than T5, but if a state where the signal value of the amplification signal is smaller than the rated value is reached, return the cushioning time of the limiter to T5.

Effects of the Invention

According to the present invention, the system stabilizing device outputs compensating power. In this connection, when the detected value of the system current or the detected value of the system voltage is about to decrease, feedback control or signal amplification is performed within the fluctuation detecting block.

Generally, a filter circuit (composed of a reactor, a capacitor and a transformer) is added to the alternating current output side of a power converter (inverter) in order to smooth a pulse voltage outputted from the inverter.

With the present invention, feedback control is exercised or signal amplification is performed within the fluctuation detecting block, whereby the above decrease is compensated for. Thus, there is no need to use a PI amplifier, or the current detector AA for detecting the current fed out from the system stabilizing device to the distribution system, namely, the output current outputted from the power converter, filtered by the filter circuit, and then sent out to the distribution system. Nevertheless, stable control actions by the system stabilizing device can be ensured.

Further, if the load fluctuation exceeds the rating, a compensating action can be inhibited from taking place, and DC power charged into the direct current charging unit can be prevented from being used wastefully.

MODE FOR CARRYING OUT THE INVENTION

A mode for carrying out the present invention will be described in detail based on embodiments of the invention.

Embodiment 1

Figure 1:
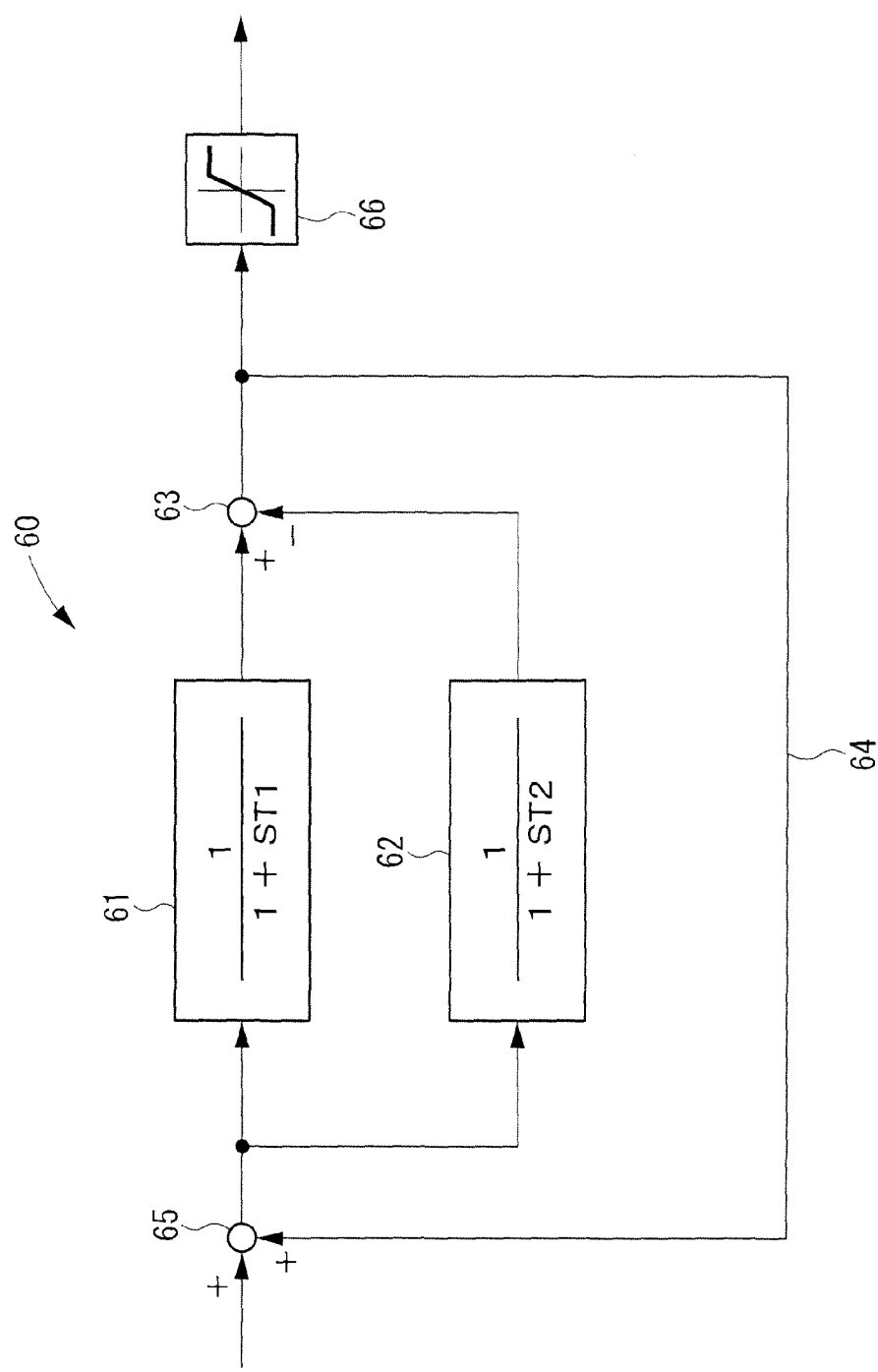
FIG. 1 is a circuit diagram showing a fluctuation detecting block according to Embodiment 1 of the present invention.
Figure 16:
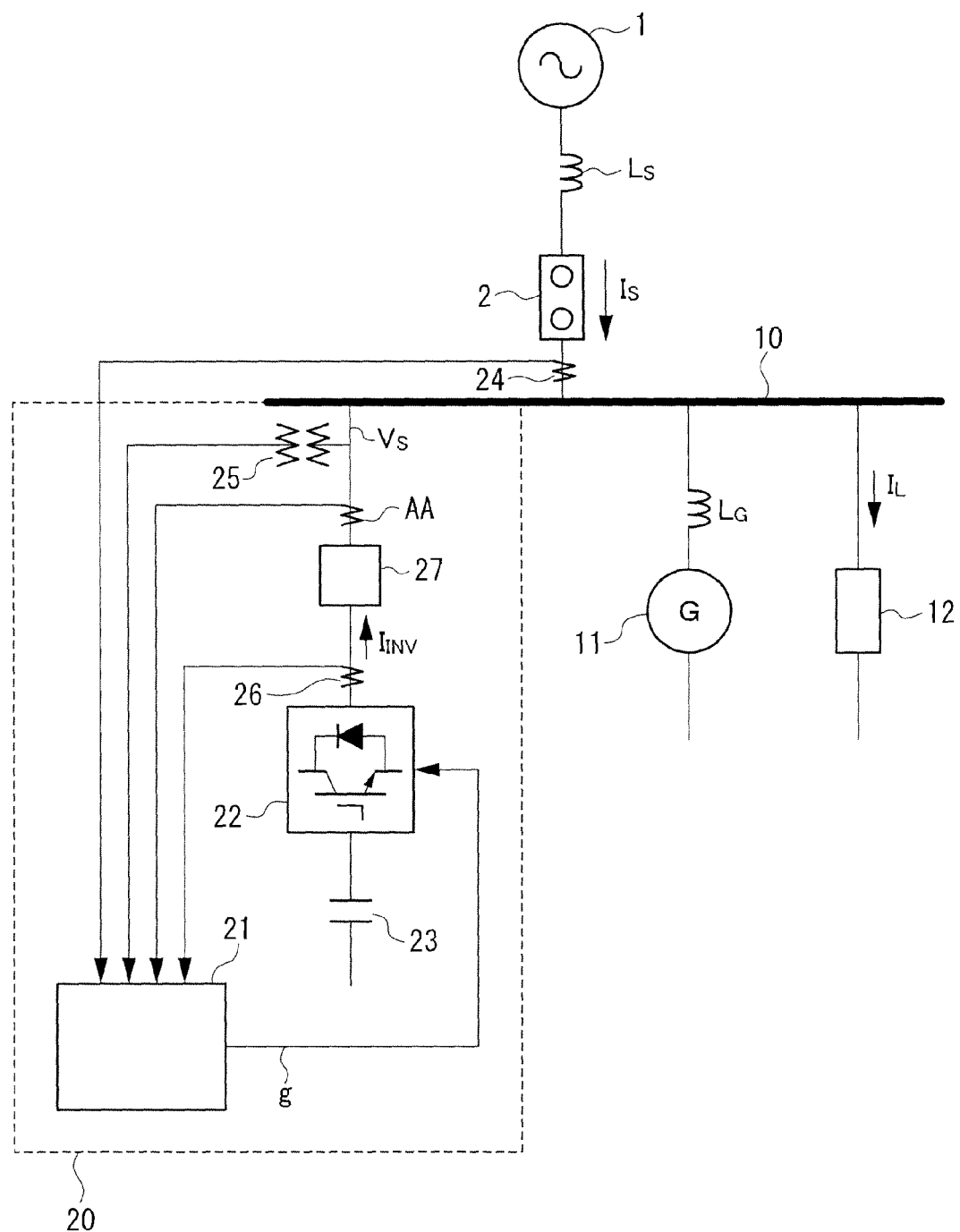
FIG. 16 is a circuit configuration diagram showing the micro grid equipped with a system stabilizing device.

FIG. 1 shows a fluctuation detecting block 60 according to Embodiment 1 of the present invention. The fluctuation detecting block 60 is applied to the fluctuation detecting blocks 105, 106, 123, 124 (see FIG. 17) incorporated into the control unit 21 of the system stabilizing device 20 (see FIG. 16).

As shown in FIG. 1, the fluctuation detecting block 60 is composed of a low-pass filter 61, a low-pass filter 62, a subtracter 63, a feedback circuit 64, an adder 65, and a rating limiter 66.

The pass band frequency of the fluctuation detecting block 60 is determined by filtering characteristics required of the respective fluctuation detecting blocks 105, 106, 123, 124. The cut-off frequency on the high frequency side of the determined pass band frequency is set to be f1, the cut-off frequency on the low frequency side of the determined pass band frequency is set to be f2, the time constant of the low-pass filter 61 for noise removal with a cut-off frequency of f1 is set to be T1, and the time constant of the low-pass filter 62 for setting the fluctuation detection time, whose cut-off frequency is f2, is set to be T2.

The low-pass filter 61 is a filter having first order lag characteristics, whose time constant is set to be the time constant T1 determined for the purpose of noise removal.

The low-pass filter 62 is a filter having first order lag characteristics, whose time constant is set to be the time constant T2 determined for the purpose of setting the time for detecting fluctuations.

When receiving an input signal and a feedback signal fed back through the feedback circuit 64, both filters 61 and 62 utilize their filtering characteristics to filter the input signal and the feedback signal.

The input signal is the active component $Is_d$ of the system current if the fluctuation detecting block 60 is the fluctuation detecting block 105, is the reactive component $Is_q$ of the system current if the fluctuation detecting block 60 is the fluctuation detecting block 106, is the frequency signal F if the fluctuation detecting block 60 is the fluctuation detecting block 123, or is the amplitude signal L if the fluctuation detecting block 60 is the fluctuation detecting block 124.

The subtracter 63 outputs a signal obtained by subtracting an output signal of the low-pass filter 62 from an output signal of the low-pass filter 61.

The signal outputted from the subtracter 63 is fed back through the feedback circuit 64, and added to the input signal by the adder 65, whereafter the sum is inputted to the low-pass filters 61, 62.

Eventually, the subtracter 63 outputs a fluctuation component signal included in the input signal to which the feedback signal has been added.

This fluctuation component signal is the current command $I_{refd}$ for the active component which is the fluctuation component of the active component $Is_d$ of the system current if the fluctuation detecting block 60 is the fluctuation detecting block 105, is the current command $I_{refq}$ for the reactive component which is the fluctuation component of the reactive component $Is_q$ of the system current if the fluctuation detecting block 60 is the fluctuation detecting block 106, is the current command $I_{refd}$ for the active component which is the fluctuation component of the frequency signal F if the fluctuation detecting block 60 is the fluctuation detecting block 123, or is the current command $I_{refq}$ for the reactive component which is the fluctuation component of the amplitude signal L if the fluctuation detecting block 60 is the fluctuation detecting block 124.

Such a fluctuation component signal is outputted after passage through the rating limiter 66. Thus, the upper limit value and lower limit value of its signal value (command value) are limited to the rated value, and then outputted.

In Embodiment 1, the feedback signal fed back by the feedback circuit 64 corresponds to the converter current $I_{INV}$. Thus, the addition of the feedback signal to the input signal is equivalent to the addition of the converter current $I_{INV}$ to the input signal.

As described above, the system stabilizing device 20 (power converter 22) makes power compensation. Even if the detected value of the system current Is during the system-interconnected run, or the detected value of the system voltage Vs during the self-supporting run decreases, therefore, the feedback signal corresponding to the AC output current is added to the input signal in the present embodiment. Consequently, the above decrease is complemented by the feedback signal.

As a result, even in the presence of a decrease in the detected value of the system current Is or the detected value of the system voltage Vs, the control actions of the system stabilizing device 20 are stable.

In addition, there is no need to use a PI amplifier, or the current detector AA for detecting the current fed out from the system stabilizing device 20 to the distribution system, namely, the output current outputted from the power converter 22, filtered by the filter circuit 27, and then sent out to the distribution system 10.

The transfer function of the fluctuation detecting block 60 of Embodiment 1 shown in FIG. 1 is represented by Expression (1) indicated below. Expression (2) is a general expression for a lag element.

[5th mathematical formulas]

$$\frac{s(T2-T1)}{(1+sT1)(1+sT2)-s(T2-T1)} = s \cdot \frac{T2-T1}{T1T1} \cdot \frac{1}{s^2 + \frac{2T1}{T1T2}s + \frac{1}{T1T1}} \quad (1)$$

$$\frac{1}{s^2 + 2\omega_0\xi + \omega_0^2} \quad (2)$$

As seen from the Expression (1), the transfer function of the fluctuation detecting block 60 can be resolved into a derivative element, a gain element, and a lag element. A comparison of the coefficients of the lag element in the Expression (1) and the lag element in the Expression (2) shows an oscillation coefficient $\zeta=(T1/T2)^{1/2}$.

Since the time constant T1 is a time constant for noise removal, it has a very small value. The time constant T2, on the other hand, is a time constant for setting the time for detecting fluctuations, so that it is normally set at a larger value than that of the time constant T1. Thus, T2>>T1 holds.

Since T2>>T1, the oscillation coefficient $\zeta$ is smaller than 1, as indicated by Formula (3), meaning that the characteristics are oscillatory.

[6th mathematical formula]

$$\zeta = \sqrt{\frac{T1}{T2}} << 1 \quad (3)$$

Embodiment 2

Figure 2:
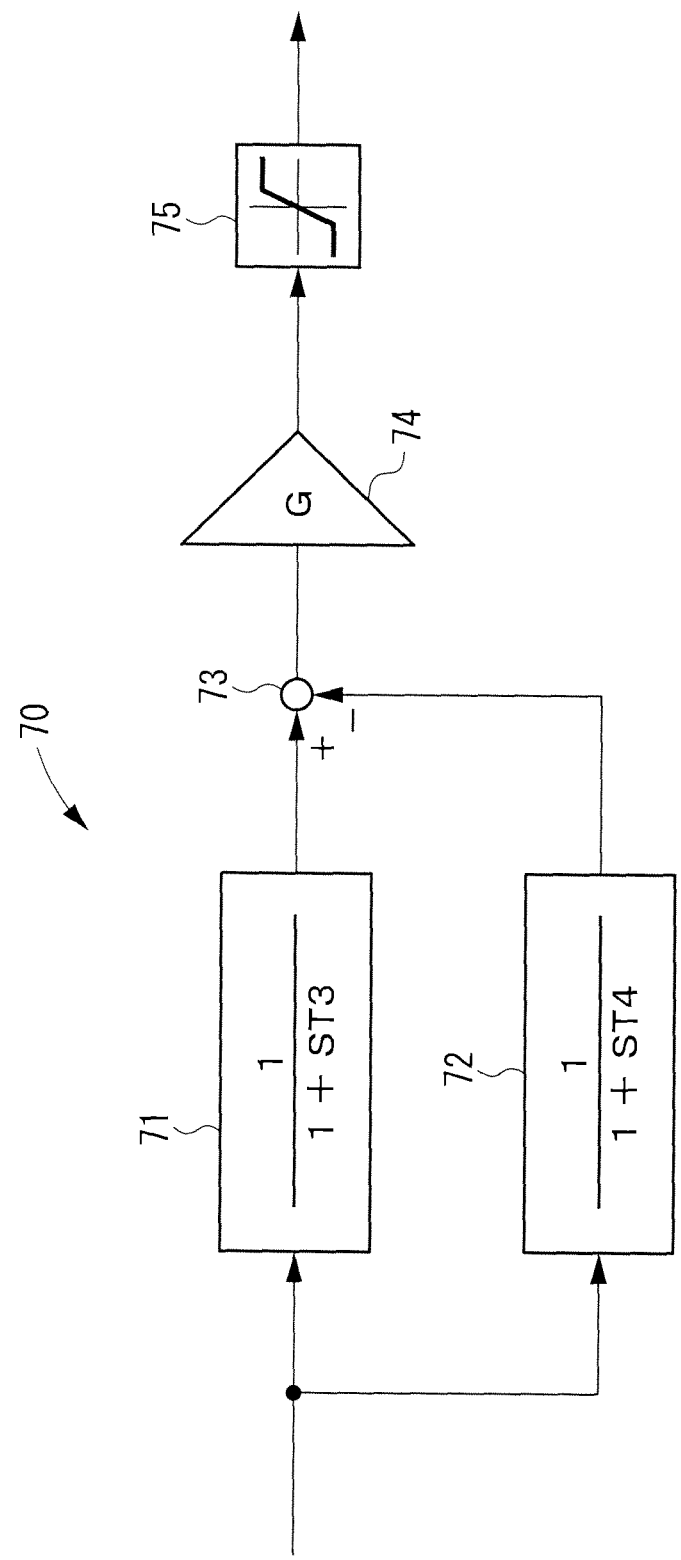
FIG. 2 is a circuit diagram showing a fluctuation detecting block according to Embodiment 2 of the present invention.

FIG. 2 shows a fluctuation detecting block 70 according to Embodiment 2 of the present invention. The fluctuation detecting block 70 is applied to the fluctuation detecting blocks 105, 106, 123, 124 (see FIG. 17) incorporated into the control unit 21 of the system stabilizing device 20 (see FIG. 16).

The fluctuation detecting block 70 of Embodiment 2 is an improvement on the fluctuation detecting block 60 of Embodiment 1, and represents a solution to the problem of Embodiment 1, namely, the problem that the characteristics are oscillatory.

As shown in FIG. 2, the fluctuation detecting block 70 is composed of a low-pass filter 71, a low-pass filter 72, a subtracter 73, an amplifier 74, and a rating limiter 75.

The pass band frequency of the fluctuation detecting block 70 is determined by filtering characteristics required of the respective fluctuation detecting blocks 105, 106, 123, 124. The cut-off frequency on the high frequency side of the determined pass band frequency is set to be f1, the cut-off frequency on the low frequency side of the determined pass band frequency is set to be f2, the time constant of the low-pass filter 71 for noise removal with a cut-off frequency of f1 is set to be T1, and the time constant of the low-pass filter 72 for setting the fluctuation detection time, whose cut-off frequency is f2, is set to be T2.

Further, a setting number α is a value represented by Formula (6) to be described later, and the following parameters are set based thereon:

$T3=T1\times\alpha, T4=T2/\alpha$

The low-pass filter 71 is a filter having first order lag characteristics, whose time constant is set to be the time constant T3. The time constant T3 is a value obtained by multiplying the time constant T1, which has been determined for the purpose of noise removal, by the setting number α.

The low-pass filter 72 is a filter having first order lag characteristics, whose time constant is set to be the time constant T4. The time constant T4 is a value obtained by dividing the time constant T2, which has been determined for the purpose of setting the time for detecting fluctuations, by the setting number α.

When receiving an input signal, both filters 71 and 72 utilize their filtering characteristics to filter the input signal.

The input signal is the active component $Is_d$ of the system current if the fluctuation detecting block 70 is the fluctuation detecting block 105; is the reactive component $Is_q$ of the system current if the fluctuation detecting block 70 is the fluctuation detecting block 106; is the frequency signal F if the fluctuation detecting block 70 is the fluctuation detecting block 123; or is the amplitude signal L if the fluctuation detecting block 70 is the fluctuation detecting block 124.

The subtracter 73 outputs a signal obtained by subtracting an output signal of the low-pass filter 72 from an output signal of the low-pass filter 71.

The subtracter 73 outputs a fluctuation component signal included in the input signal.

If the fluctuation detecting block 70 is the fluctuation detecting block 105, the fluctuation component signal is the current command $I_{refd}$ for the active component which is the fluctuation component of the active component $Is_d$ of the system current. If the fluctuation detecting block 70 is the fluctuation detecting block 106, the fluctuation component signal is the current command $I_{refq}$ for the reactive component which is the fluctuation component of the reactive component $Is_q$ of the system current. If the fluctuation detecting block 70 is the fluctuation detecting block 123, the fluctuation component signal is the current command $I_{refd}$ for the active component which is the fluctuation component of the frequency signal F. If the fluctuation detecting block 70 is the fluctuation detecting block 124, the fluctuation component signal is the current command $I_{refq}$ for the reactive component which is the fluctuation component of the amplitude signal L.

The fluctuation component signal outputted from the subtracter 73 is amplified by the amplifier 74. The gain G of this amplifier 74 is a value expressed by Formula (7) to be described later.

Further, the fluctuation component signal amplified by the amplifier 74 is outputted after passage through the rating limiter 75. Thus, the upper limit value and lower limit value of its signal value (command value) are limited to the rated value, and then outputted.

In Embodiment 2, the fluctuation component signal is amplified by the amplifier 74, and the amplified signal is outputted as the current command $I_{refd}$ for the active component or the current command $I_{refq}$ for the reactive component.

As described above, the system stabilizing device 20 (power converter 22) makes power compensation. Even if the detected value of the system current Is during the system-interconnected run, or the detected value of the system voltage Vs during the self-supporting run decreases, therefore, the above decrease is complemented by amplification by the amplifier 74. This is because the signal obtained by amplifying the fluctuation component signal by the amplifier 74 is outputted as the current command $I_{refd}$ for the active component or the current command $I_{refq}$ for the reactive component.

As a result, even in the presence of a decrease in the detected value of the system current Is or the detected value of the system voltage Vs, the control actions of the system stabilizing device 20 are stable.

In addition, there is no need to use a PI amplifier, or the current detector AA for detecting the current fed out from the system stabilizing device 20 to the distribution system, namely, the output current outputted from the power converter 22, filtered by the filter circuit 27, and then sent out to the distribution system 10.

The characteristics of the fluctuation detecting block 70 will now be explained.

The transfer function of the fluctuation detecting block 70 is represented by Expression (4) indicated below.

[7th mathematical formula]

$$G \cdot \frac{s\left(\frac{T2}{\alpha} - T1 \cdot \alpha\right)}{(1 + sT1 \cdot \alpha)\left(1 + s\frac{T2}{\alpha}\right)} = \quad (4)$$

$$s \cdot \frac{G\left[\frac{T2}{\alpha} - T1 \cdot \alpha\right]}{T1T1} \cdot \frac{1}{s^2 + \frac{T1 \cdot \alpha + \frac{T2}{\alpha}}{T1T2}s + \frac{1}{T1T2}}$$

The oscillation coefficient ζ of the lag element in the Expression (4) is expressed by Formula (5) indicated below. If this parameter is designed as ζ>1 in the Formula (5), the characteristics of the fluctuation detecting block 70 are not oscillatory.

[8th mathematical formula]

$$\zeta = \frac{T1 \cdot \alpha + \frac{T2}{\alpha}}{2\sqrt{T1T2}} \quad (5)$$

By modifying the Formula (5), the setting number α can be expressed by Formula (6) presented below.

The gain G can be expressed by Formula (7) by comparing the term of the gain in the Expression (1) with the term of the gain in the Expression (4).

[9th mathematical formulas]

$$\alpha = \frac{2\sqrt{T1T2} \cdot \xi \pm \sqrt{4T1 \cdot T2 \cdot \xi^2 - 4T1 \cdot T2}}{2T1} \quad (6)$$

$$G = \frac{\alpha(T2 - T1)}{T2 - \alpha^2 T1} \quad (7)$$

A method for designing the respective filters 71 and 72 of the fluctuation detecting block 70 is to set ζ indicated by the Formula (5) as ζ>1, and then determine the setting number α and the gain G by use of the Formulas (6) and (7).

By so doing, ζ can be set as ζ>1, exhibiting the feature that the characteristics of the fluctuation detecting block 70 are not oscillatory.

Embodiment 3

In Embodiment 3, the configuration of the fluctuation detecting block 70 is itself the same as that in Embodiment 2, but the procedure of the method for designing the respective filters 71 and 72 of the fluctuation detecting block 70 is different.

In the designing method of Embodiment 3, the gain G is determined first, and then the setting number α is determined. By so doing, it becomes possible to carry out a design placing priority on the term of the gain G, rather than a design using the oscillation coefficient ζ as an indicator.

Concretely, upon comparison between the coefficients of the term of the gain shown by the Expression (1) and the term of the gain shown by the Expression (4), the setting number α after setting of the gain G is expressed by the following Formula (8).

[10th mathematical formula]

$$\alpha = \frac{-(T2-T1) \pm \sqrt{(T2-T1)^2 + 4G^2 \cdot T1 \cdot T2}}{2T1 \cdot G} \quad (8)$$

The oscillation coefficient ζ is the same as that in the Formula (5) shown in Embodiment 2.

Figure 17:
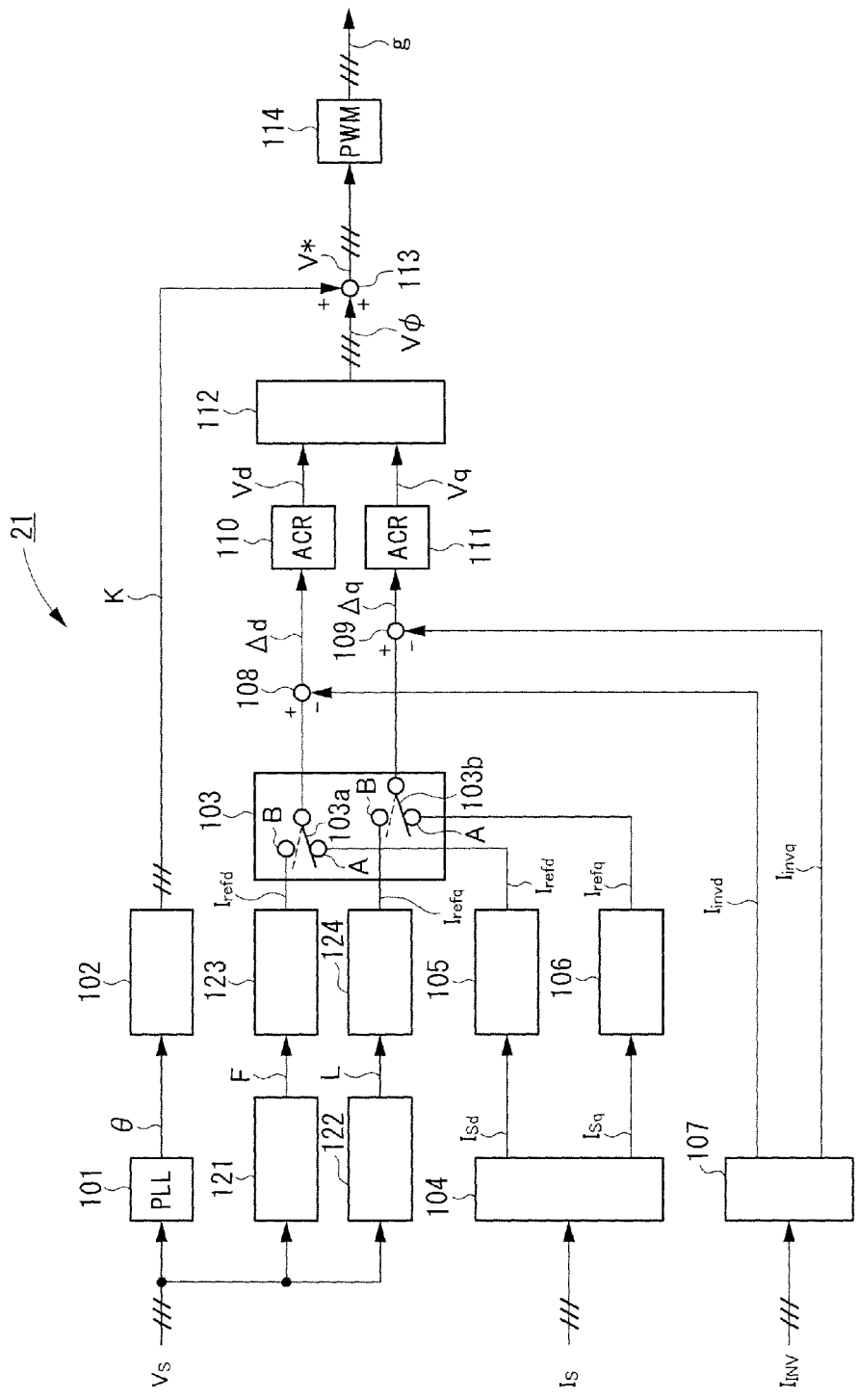
FIG. 17 is a circuit diagram showing a control unit of the system stabilizing device.
Figure 18:
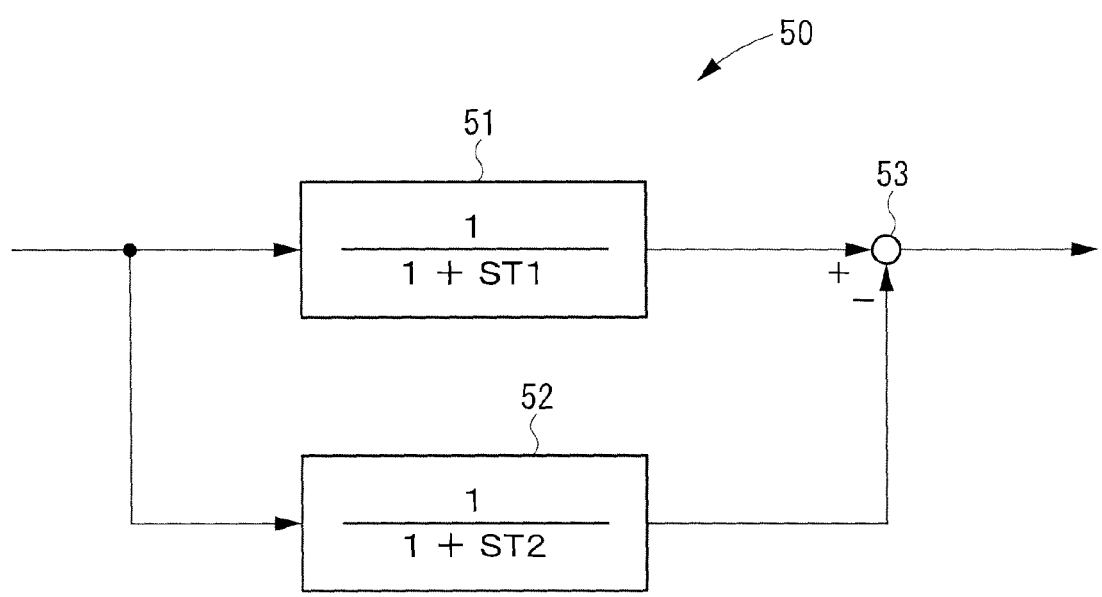
FIG. 18 is a circuit diagram showing a conventional fluctuation detecting block.

Here, the control unit 21 is constructed by adopting the fluctuation detecting blocks 70 as the fluctuation detecting blocks 105, 106, 123, 124 shown in FIG. 17. The current characteristics of the distribution system (see FIG. 16) when the system stabilizing device 20 incorporating the control unit 21 was used will be described by reference to FIGS. 3(a) to 3(c).

Figure 3:
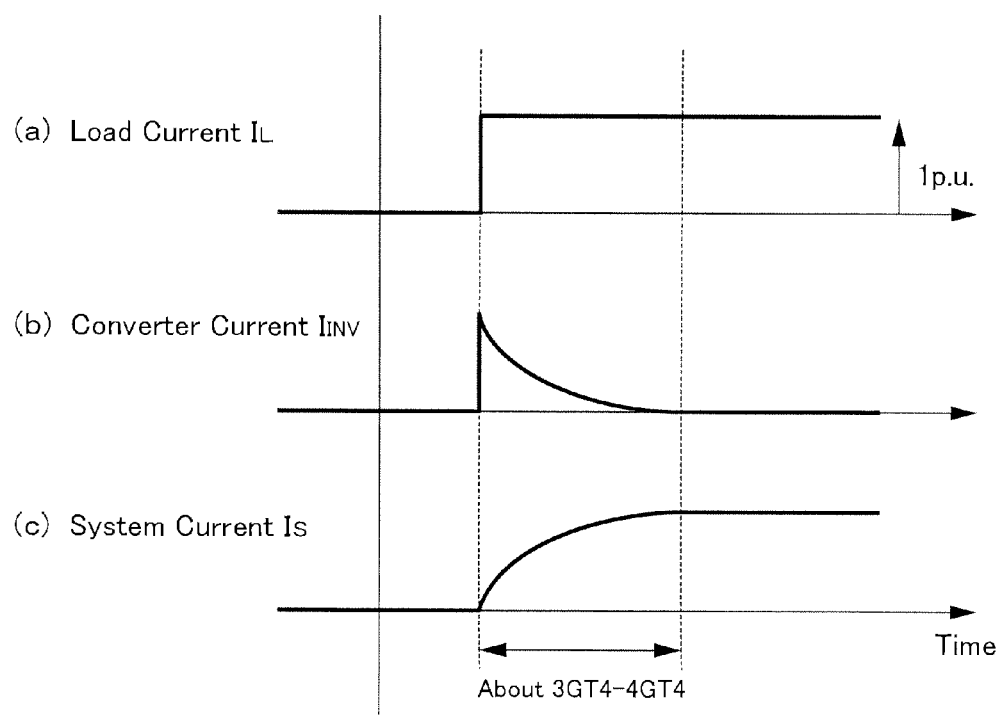
FIGS. 3(a) to 3(c) are characteristic charts showing current characteristics when Embodiment 2 was used.

These current characteristics are the characteristics during the system-interconnected run. In FIGS. 3(a) to 3(c), "p.u." refers to a unit symbol, and 1 p.u. represents the rated value.

When a load current $I_L$ increases stepwise to the rated value (the current value suddenly changes from 0 to the rated value) as shown in FIG. 3(a), a converter current $I_{INV}$, whose current value gradually decreases from the rated value down to zero, is outputted from the power converter 22 as shown in FIG. 3(b). On the other hand, the system current Is increases with first order lag characteristics and then reaches the rated value, as shown in FIG. 3(c).

Embodiment 4

Figure 4:
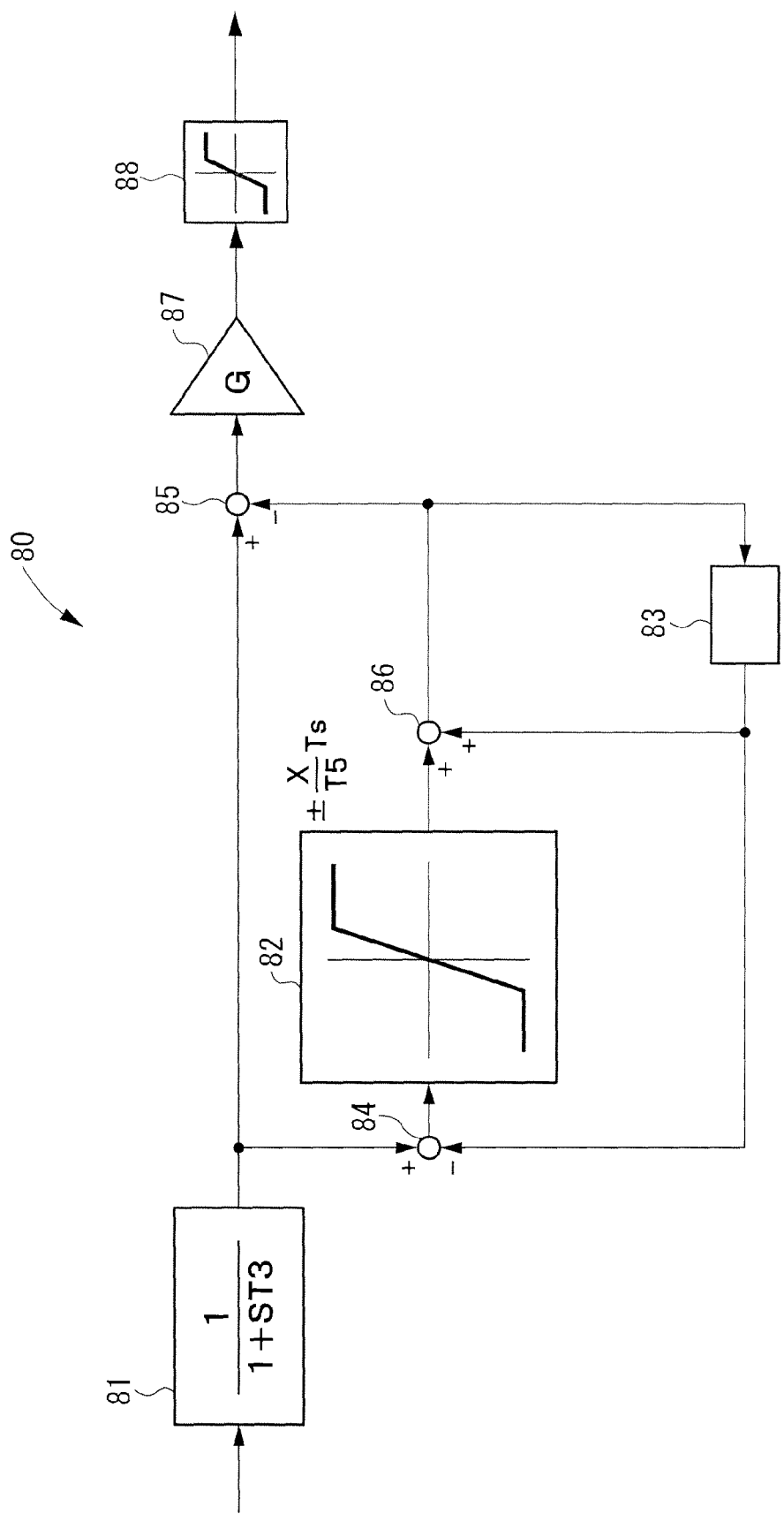
FIG. 4 is a circuit diagram showing a fluctuation detecting block according to Embodiment 4 of the present invention.

FIG. 4 shows a fluctuation detecting block 80 according to Embodiment 4 of the present invention. The fluctuation detecting block 80 is applied to the fluctuation detecting blocks 105, 106, 123, 124 (see FIG. 17) incorporated into the control unit 21 of the system stabilizing device 20 (see FIG. 16).

As shown in FIG. 4, the fluctuation detecting block 80 is composed of a low-pass filter 81, a limiter 82, a delay circuit 83, a first subtracter 84, a second subtracter 85, an adder 86, an amplifier 87, and a rating limiter 88.

The pass band frequency of the fluctuation detecting block 80 is determined by filtering characteristics required of the respective fluctuation detecting blocks 105, 106, 123, 124. The cut-off frequency on the high frequency side of the determined pass band frequency is set to be f1. The time constant of the low-pass filter for noise removal, which has the cut-off frequency set at f1, is set to be T1. Here, f1=1/T1.

Further, a setting number α is a value expressed by the aforementioned Formula (6), and the following parameter is set based thereon:

$$T3 = T1 \times \alpha$$

The low-pass filter 81 is a filter having first order lag characteristics, whose time constant is set to be the time constant T3. The time constant T3 is a value obtained by multiplying the time constant T1, which has been determined for the purpose of noise removal, by the setting number α.

When receiving an input signal, the low-pass filter 81 utilizes its filtering characteristics to filter the input signal.

If the fluctuation detecting block 80 is the fluctuation detecting block 105, the input signal is the active component $Is_d$ of the system current. If the fluctuation detecting block 80 is the fluctuation detecting block 106, the input signal is the reactive component $Is_q$ of the system current. If the fluctuation detecting block 80 is the fluctuation detecting block 123, the input signal is the frequency signal F. If the fluctuation detecting block 80 is the fluctuation detecting block 124, the input signal is the amplitude signal L.

The limiter 82 has limiting characteristics defined as ±(X/T5)Ts.

T5 represents a cushioning time set at an arbitrary duration, Ts represents one sampling period, and X represents a limiting value.

This limiter 82 limits the amount of change for one sampling period Ts. When the signal value of the signal inputted to the limiter 82 is a value between +X (upper limiting value) and −X (lower limiting value), the limiter 82 holds the signal value of the signal as such, and outputs it. When the signal value of the signal inputted to the limiter 82 is above +X (upper limiting value), the limiter 82 allows the value to increase with a constant gradient for a predetermined time, and then limits the value to +X. When the signal value of the signal inputted to the limiter 82 is below −X (lower limiting value), the limiter 82 allows the value to decrease with a constant gradient for a predetermined time, and then limits the value to −X.

The delay circuit 83 has the properties of delaying the inputted signal by one sampling period Ts and outputting the delayed signal. This delay circuit 83 can be constructed, for example, by a Z transformation circuit having such properties as to show $Z^{-1}$.

The subtracter 84 subtracts the output signal of the delay circuit 83 from the output signal of the filter 81 having the first order lag characteristics, and sends a signal corresponding to the difference to the limiter 82.

That is, the output signal of the delay circuit 83 is provided as negative feedback at the stage preceding the limiter 82.

The adder 86 adds the signal outputted from the limiter 82 and the signal outputted from the delay circuit 83, and outputs the sum.

That is, the output signal of the delay circuit 83 is provided as positive feedback at the stage succeeding the limiter 82.

The delay circuit 83 delays the signal outputted from the adder by one sampling period Ts, and outputs the delayed signal.

As described above, the signal outputted from the delay circuit 83 is provided as negative feedback at the stage preceding the limiter 82, and is provided as positive feedback at the stage succeeding the limiter 83. Thus, the signal status is as follows:

The output of the subtracter 84 is "the present sampled value—the value after limiter processing performed one sampling period previously".

Thus, if the signal value inputted from the filter 81 to the subtracter 84 is +X or less, but −X or more, the signal value outputted from the limiter 82 is 0.

If the signal value inputted from the filter 81 to the subtracter 84 is above +X, but below −X, on the other hand, the signal value outputted from the limiter 82 is a value whose upper limit value and lower limit value are restricted by the limiting values (+X, −X).

The output of the adder 86 is "the output of the limiter+the value after limiter processing performed one sampling period previously".

Thus, if the signal value inputted from the filter 81 to the subtracter 84 is above +X, but below −X, the signal value outputted from the adder 86 linearly increases.

The subtracter 85 subtracts the output signal of the adder 86 from the output signal of the low-pass filter 81 having the first order lag characteristics, and outputs the difference. A fluctuation component signal included in the input signal is outputted from the subtracter 85.

If the fluctuation detecting block 80 is the fluctuation detecting block 105, the fluctuation component signal is the current command $I_{refd}$ for the active component which is the fluctuation component of the active component $Is_d$ of the system current. If the fluctuation detecting block 80 is the fluctuation detecting block 106, the fluctuation component signal is the current command $I_{refq}$ for the reactive component which is the fluctuation component of the reactive component $Is_q$ of the system current. If the fluctuation detecting block 80 is the fluctuation detecting block 123, the fluctuation component signal is the current command $I_{refd}$ for the active component which is the fluctuation component of the frequency signal F. If the fluctuation detecting block 80 is the fluctuation detecting block 124, the fluctuation component signal is the current command $I_{refq}$ for the reactive component which is the fluctuation component of the amplitude signal L.

The fluctuation component signal outputted from the subtracter 85 is amplified by the amplifier 87.

The gain G of this amplifier 87 is the value expressed by the aforementioned Formula (7).

Further, the fluctuation component signal amplified by the amplifier 87 is outputted after passage through the rating limiter 88. Thus, the upper limit value and lower limit value of its signal value (command value) are limited to the rated value, and then outputted.

In Embodiment 4, the fluctuation component signal is amplified by the amplifier 87, and the amplified signal is outputted as the current command $I_{refd}$ for the active component or the current command $I_{refq}$ for the reactive component.

As described above, the system stabilizing device 20 (power converter 22) makes power compensation. Even if the detected value of the system current Is during the system-interconnected run, or the detected value of the system voltage Vs during the self-supporting run decreases, therefore, the above decrease is complemented by amplification by the amplifier 87. This is because the signal obtained by amplifying the fluctuation component signal by the amplifier 87 is outputted as the current command $I_{refd}$ for the active component or the current command $I_{refd}$ for the reactive component.

As a result, even in the presence of a decrease in the detected value of the system current Is or the detected value of the system voltage Vs, the control actions of the system stabilizing device 20 are stable.

In addition, there is no need to use a PI amplifier, or the current detector AA for detecting the current fed out from the system stabilizing device 20 to the distribution system, namely, the output current outputted from the power converter 22, filtered by the filter circuit 27, and then sent out to the distribution system 10.

A method for designing the filter 81 of the fluctuation detecting block 80 is to set ζ indicated by the Formula (5) as ζ>1, and then determine the setting number α and the gain G by use of the Formulas (6) and (7).

By so doing, ζ can be set as ζ>1, exhibiting the feature that the characteristics of the fluctuation detecting block 80 are not oscillatory.

Here, the control unit 21 is constructed by adopting the fluctuation detecting blocks 80 as the fluctuation detecting blocks 105, 106, 123, 124 shown in FIG. 17. The current characteristics of the distribution system (see FIG. 16) when the system stabilizing device 20 incorporating the control unit 21 was used will be described by reference to FIGS. 5(a) to 5(c).

Figure 5:
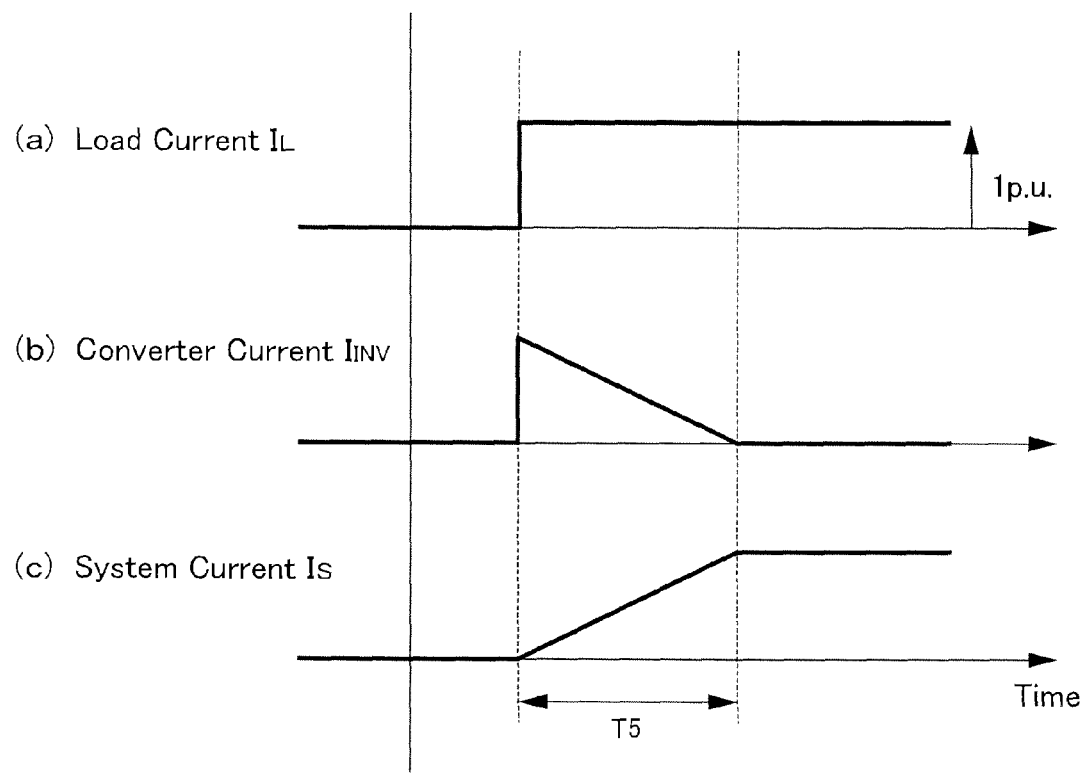
FIGS. 5(a) to 5(c) are characteristic charts showing current characteristics when Embodiment 4 was used.

These current characteristics are the characteristics during the system-interconnected run. In FIGS. 5(a) to 5(c), "p.u." refers to a unit symbol, and 1 p.u. represents the rated value.

When the load current $I_L$ increases stepwise to the rated value (the current value suddenly changes from 0 to the rated value) as shown in FIG. 5(a), the converter current $I_{INV}$, whose current value linearly decreases from the rated value down to zero, is outputted from the power converter 22 as shown in FIG. 5(b). On the other hand, the system current Is linearly increases to reach the rated value, as shown in FIG. 5(c).

Embodiment 5

In Embodiment 5, the configuration of the fluctuation detecting block 80 is itself the same as that in Embodiment 4, but the procedure of the method for designing the filter 81 of the fluctuation detecting block 80 is different.

In the designing method of Embodiment 5, the gain G is determined first, and then the setting number α is determined. By so doing, it becomes possible to carry out a design placing priority on the term of the gain G, rather than a design using the oscillation coefficient ζ as an indicator.

Concretely, upon comparison between the coefficients of the term of the gain shown by the Expression (1) and the term of the gain shown by the Expression (4), the setting number α after setting of the gain G is expressed by the aforementioned Formula (8).

The oscillation coefficient ζ is the same as that in the aforementioned Formula (5).

<Points of the Fluctuation Detecting Blocks 70, 80 to be Improved>

In connection with the fluctuation detecting block 70 shown in FIG. 2 and the fluctuation detecting block 80 shown in FIG. 4, their actions pose no problems if load fluctuations are within the range of the rating. However, in case load fluctuations exceed the rating, their actions may be problematical.

An explanation will be offered in this connection by reference to FIGS. 6(a) to 6(e) and FIGS. 7(a) to 7(e). In FIGS. 6(a) to 6(e), 7(a) to 7(e), "p.u." refers to a unit symbol, and 1 p.u. represents the rated value, while 3 p.u. represents a value which is 3 times the rating.

The control unit 21 is constructed by adopting the fluctuation detecting blocks 70 as the fluctuation detecting blocks 105, 106, 123, 124 shown in FIG. 17. The current characteristics of the distribution system (see FIG. 16) when the load fluctuation became 3 times the rating with the use of the system stabilizing device 20 incorporating the control unit 21 will be described by reference to FIGS. 6(a) to 6(e). These current characteristics are the characteristics during the system-interconnected run.

When the load sharply increases to a value 3 times the rating, whereupon the load current $I_L$ increases stepwise (the current value suddenly changes from 0 to the value 3 times the rating) as shown in FIG. 6(a), it is ideal that the converter current $I_{INV}$ corresponding to the rating be outputted from the power converter 22 as shown in FIG. 6(b), and the system current Is be changed as shown in FIG. 6(c).

If the load fluctuation exceeding the rating occurs, however, in the section at a stage preceding the rating limiter 75 of the fluctuation detecting block 70, computations are performed on the premise that no upper limit is imposed on a fluctuation which can be compensated for. A fluctuation component signal computed in this manner is restricted to the rated value by the rating limiter 75, and outputted.

In FIG. 6(d), dashed lines represent the converter current $I_{INV}$ when the computation of the fluctuation component signal was performed on the premise that no upper limit is imposed on fluctuations which can be compensated for; and solid lines represent the converter current $I_{INV}$ when the fluctuation component signal was restricted to the rated value by the rating limiter 75.

Figure 6:
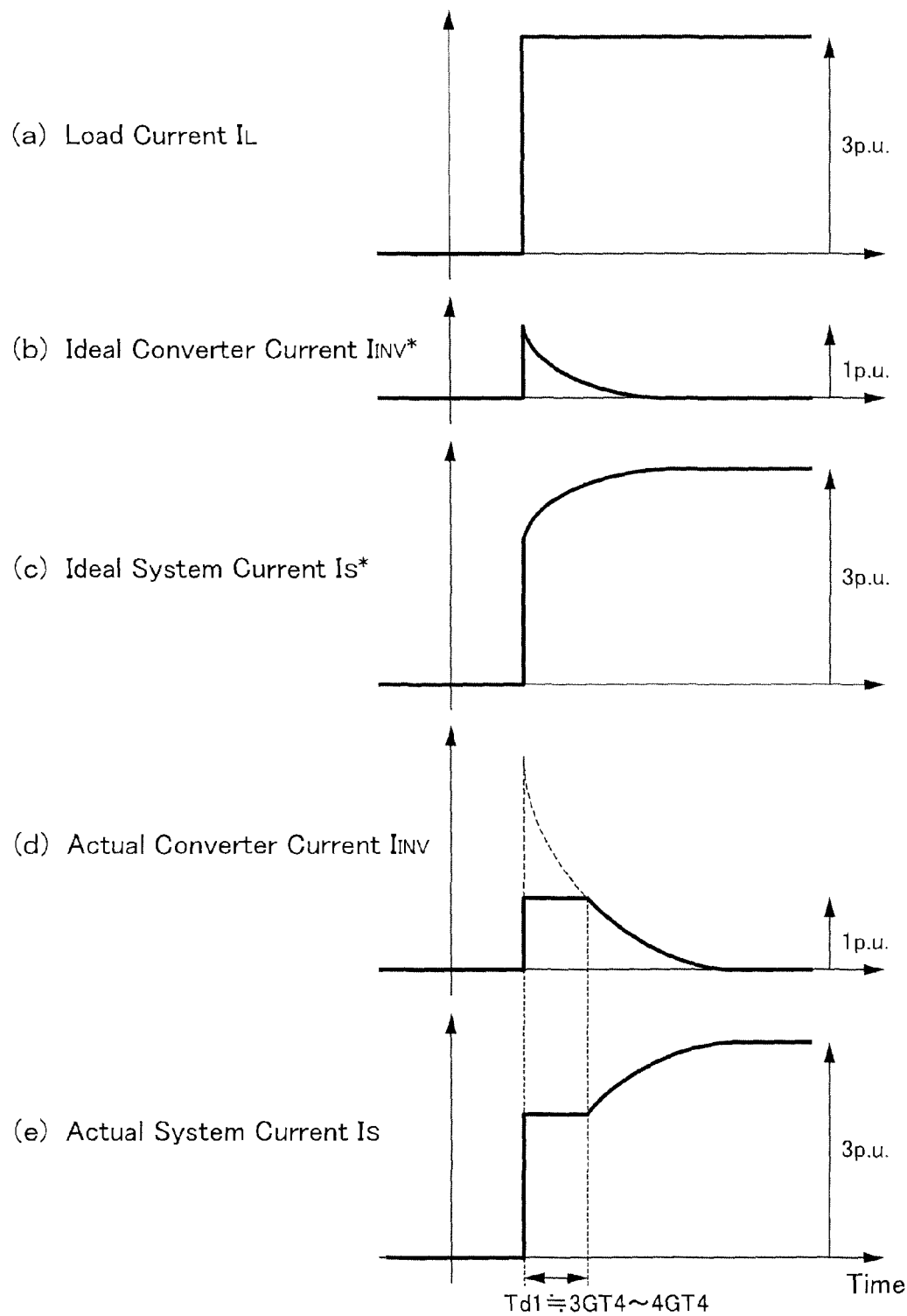
FIGS. 6(a) to 6(e) are characteristic charts showing current characteristics when a load fluctuation exceeding the rating occurred while Embodiment 2 was used.

As indicated by the solid lines in FIG. 6(*d*), after the converter current $I_{INV}$ of the rated value is outputted during the term Td1, an overcompensating action is performed such that this converter current $I_{INV}$ gradually decreases. That is, the converter current $I_{INV}$ of the rated value is outputted during the term Td1, thereby triggering the overcompensating action.

Once such an overcompensating action is performed, if an additional load fluctuation (load increase) occurs during this term Td1, this fluctuation cannot be compensated for at all.

FIG. 6(*e*) shows the actual system current Is.

The control unit 21 is constructed by adopting the fluctuation detecting blocks 80 as the fluctuation detecting blocks 105, 106, 123, 124 shown in FIG. 17. The current characteristics of the distribution system (see FIG. 16) when the load fluctuation became 3 times the rating with the use of the system stabilizing device 20 incorporating the control unit 21 will be described by reference to FIGS. 7(*a*) to 7(*e*). These current characteristics are the characteristics during the system-interconnected run.

Figure 7:
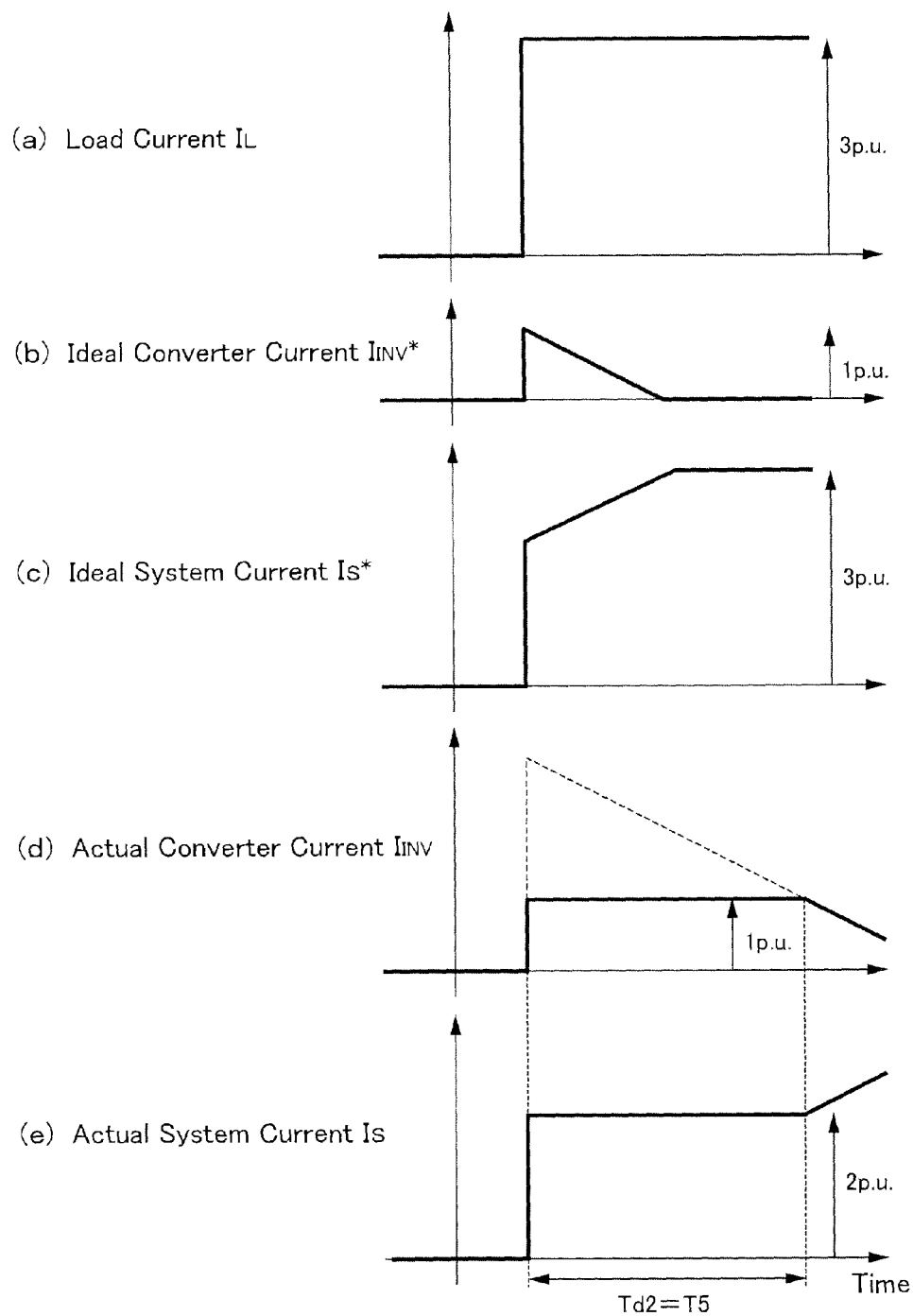
FIGS. 7(a) to 7(e) are characteristic charts showing current characteristics when a load fluctuation exceeding the rating occurred while Embodiment 4 was used.

When the load sharply increases to a value 3 times the rating, whereupon the load current $I_L$ increases stepwise (the current value suddenly changes from 0 to the value 3 times the rating) as shown in FIG. 7(*a*), it is ideal that the converter current $I_{INV}$ corresponding to the rating be outputted from the power converter 22 as shown in FIG. 7(*b*), and the system current Is be changed as shown in FIG. 7(*c*).

If the load fluctuation exceeding the rating occurs, however, in the section at a stage preceding the rating limiter 88 of the fluctuation detecting block 80, computations are performed on the premise that no upper limit is imposed on the fluctuation which can be compensated for. A fluctuation component signal computed in this manner is restricted to the rated value by the rating limiter 88, and outputted.

In FIG. 7(*d*), dashed lines represent the converter current $I_{INV}$ when the computation of the fluctuation component signal was performed on the premise that no upper limit is imposed on fluctuations which can be compensated for; and solid lines represent the converter current $I_{INV}$ when the fluctuation component signal was restricted to the rated value by the rating limiter 88.

As indicated by the solid lines in FIG. 7(*d*), after the converter current $I_{INV}$ of the rated value is outputted during the term Td2, an overcompensating action is performed such that this converter current $I_{INV}$ linearly decreases. That is, the converter current $I_{INV}$ of the rated value is outputted during the term Td2, thereby triggering the overcompensating action.

Once such an overcompensating action is performed, if an additional load fluctuation (load increase) occurs during this term Td2, this fluctuation cannot be compensated for at all.

FIG. 7(*e*) shows the actual system current Is.

Once such an overcompensating action is performed, if an additional load fluctuation (load increase) occurs during the term Td1 or Td2, the problem arises that this fluctuation cannot be compensated for at all.

Moreover, during the term Td1 or Td2 where the overcompensating action is performed, the converter current $I_{INV}$ is outputted wastefully. This causes the problem that power charged in the direct current charging unit 23 is wasted.

When the direct current charging unit 23 is composed of an electric double layer capacitor, in particular, the electric double layer capacitor is smaller in storage capacity than a battery. Thus, if power is used up wastefully because of such a phenomenon, a state where a load fluctuation occurring next cannot be suppressed tends to appear.

Embodiments to be described below, including Embodiment 6, are designed to be capable of exercising optimal control for system stabilization, while avoiding an overcompensating action, even if a load fluctuation exceeding the rating occurs.

Embodiment 6

Figure 8:
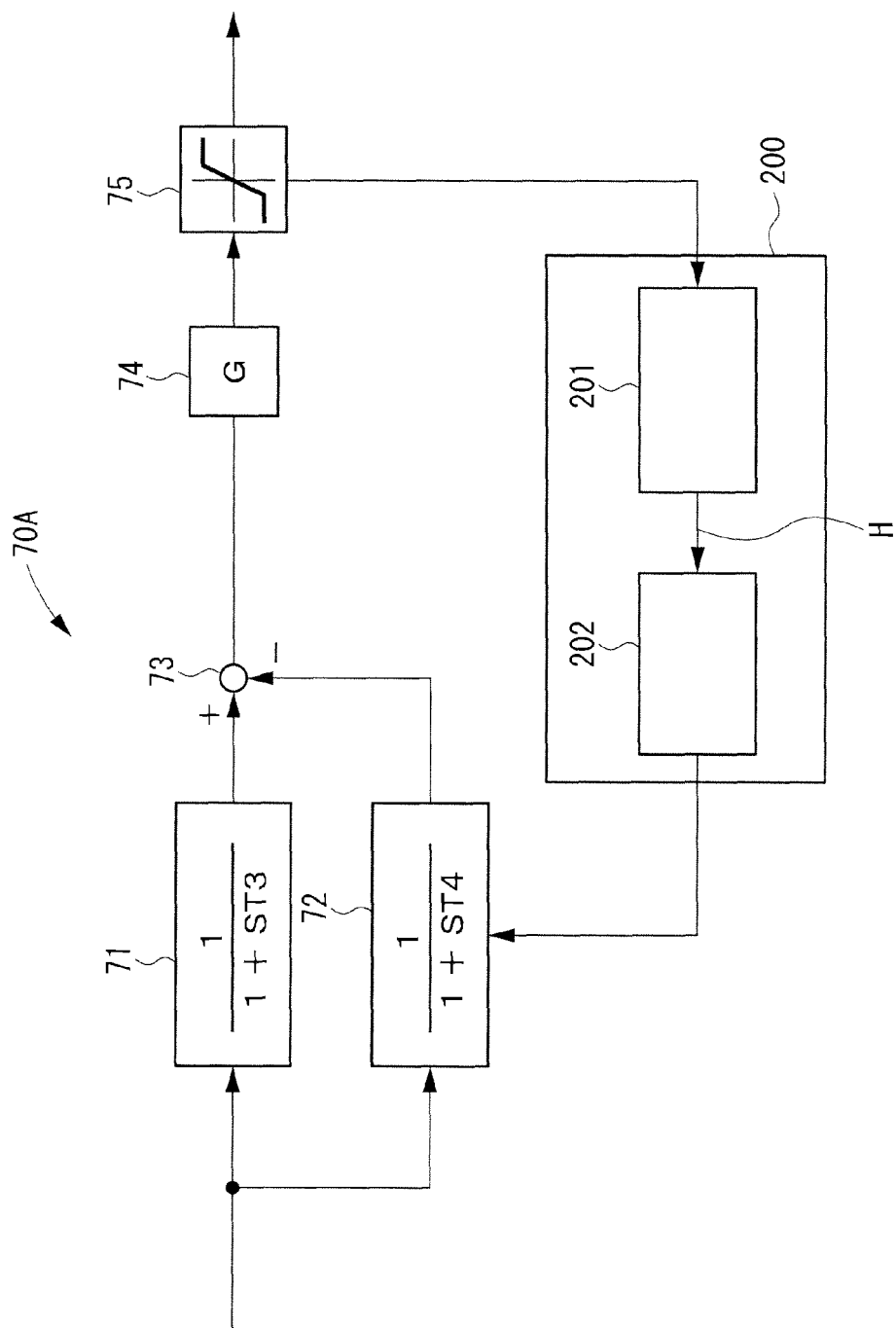
FIG. 8 is a circuit diagram showing a fluctuation detecting block according to Embodiment 6 of the present invention.

FIG. 8 shows a fluctuation detecting block 70A according to Embodiment 6 of the present invention. This fluctuation detecting block 70A has an overcompensation inhibiting unit 200 further added to the configuration of the fluctuation detecting block 70 shown in FIG. 2.

Thus, the overcompensation inhibiting unit 200 will be mainly described, with the same parts as those in the fluctuation detecting block 70 being assigned the same numerals as in the fluctuation detecting block 70, and a duplicate explanation being omitted.

The overcompensation inhibiting unit 200 has a limiter over determination block 201, and a time constant changing block 202.

The limiter over determination block 201 is composed of a timer or a digital counter, and detects that the signal value of the fluctuation component signal inputted to the rating limiter 75 has reached a value equal to or more than the rated value (±1 p.u.) set in the rating limiter 75, thus arousing a limiting action, whereby the signal value of the fluctuation component signal outputted from the rating limiter 75 has been limited to the rated value.

Further, the limiter over determination block 201 outputs a time constant changing signal H (1) when a timer time during which "a limiting action for allowing the signal value of the fluctuation component signal outputted from the rating limiter 75 to be limited to the rated value (±1 p.u.)" continues lasts for a predetermined constant time or more (in the case of the limiter over determination block 201 being composed of the timer), or (2) when the number of "the limiting actions for allowing the signal value of the fluctuation component signal outputted from the rating limiter 75 to be limited to the rated value (±1 p.u.)" exceeds a predetermined count number (in the case of the limiter over determination block 201 being composed of the digital counter).

If the signal value of the fluctuation component signal inputted to the rating limiter 75 becomes less than the rated value (±1) after outputting of the time constant changing signal H, the limiter over determination block 201 stops the outputting of the time constant changing signal H and resets the timer time and the count number.

In the absence of the time constant changing signal H outputted from the limiter over determination block 201, the time constant changing block 202 maintains the time constant T4 set in the low-pass filter 72 as such.

In the presence of the time constant changing signal H outputted from the limiter over determination block 201, by contrast, the time constant changing block 202 changes the time constant of the low-pass filter 72 to a smaller value, for example, a third of T4.

When outputting of the time constant changing signal H from the limiter over determination block 201 is stopped, the time constant changing block 202 immediately returns the time constant of the low-pass filter 72 to the time constant T4.

The control unit 21 is constructed by adopting the fluctuation detecting blocks 70A as the fluctuation detecting blocks 105, 106, 123, 124 shown in FIG. 17. The current characteristics of the distribution system (see FIG. 16) when the load fluctuation became 3 times the rating with the use of the system stabilizing device 20 incorporating the control unit 21 will be described by reference to FIGS. 9(a) to 9(c). These current characteristics are the characteristics during the system-interconnected run.

Figure 9:
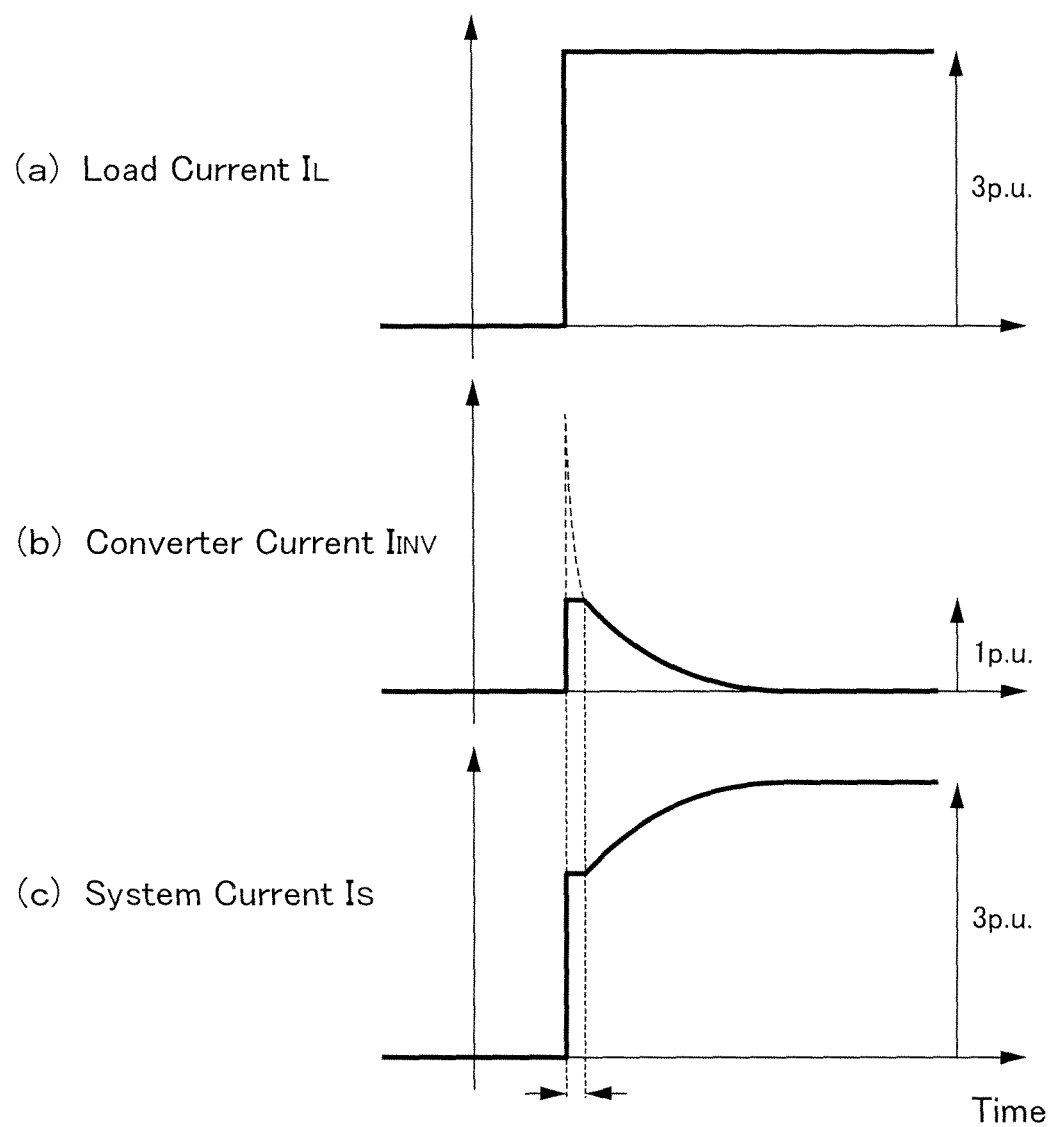
FIGS. 9(a) to 9(c) are characteristic charts showing current characteristics when Embodiment 6 was used.

When the load sharply increases to a value 3 times the rating, whereupon the load current $I_L$ increases stepwise (the current value suddenly changes from 0 to the value 3 times the rating) as shown in FIG. 9(a), the fluctuation component signal inputted to the rating limiter 75 grows beyond the rating. If this state persists for a predetermined constant time or longer, the time constant changing signal H is outputted from the limiter over determination block 201, and the time constant of the low-pass filter 72 is changed from T4 to ⅓×(T4) by the time constant changing block 202.

The time constant set in the low-pass filter 72 defines the fluctuation detection time. If this time constant is rendered smaller, therefore, the period of time during which the fluctuation component signal inputted to the rating limiter 75 exceeds the rated value can be shortened. In other words, the time during which the fluctuation component signal outputted from the rating limiter 75 remains to be the rated value can be shortened.

Hence, the time during which the converter signal $I_{INV}$ of the rated value is outputted shortens, as indicated by solid lines in FIG. 9(b).

As described above, if the time constant set in the low-pass filter 72 is rendered small, the fluctuation component signal inputted to the rating limiter 75 also decreases. If the fluctuation component signal inputted to the rating limiter 75 falls short of the rated value, the time constant changing signal H from the limiter over determination block 201 is stopped, so that the time constant of the low-pass filter 72 is returned to T4 by the time constant changing block 202.

After the time constant returns to T4, therefore, the value of the converter current $I_{INV}$ gradually decreases in accordance with the decrease characteristics defined by the time constant T4, as indicated by the solid lines in FIG. 9(b).

After all, the time during which the value of the converter current $I_{INV}$ remains to be the rated value can be shortened. That is, the value of the converter current $I_{INV}$ keeps the rated value only for a short term, but thereafter, gradually decreases in accordance with the decrease characteristics defined by the time constant T4.

As noted above, the value of the converter current $I_{INV}$ outputted as a compensating current assumes the rated value only for a short time after a sharp increase in the load. Afterwards, however, its value gradually decreases in accordance with the decrease characteristics defined by the time constant T4. Thus, the system current Is fluctuates low, as shown in FIG. 9(c).

The time during which the converter current $I_{INV}$ takes on the rated value is shortened as above. Thus, power kept charged in the direct current charging unit 23 can be prevented from wasteful usage.

Embodiment 6 can also be realized by performing computations using computing programs (software) preset in a computer.

That is, with the embodiment utilizing software, the fluctuation detecting block 70A can be constructed as computing programs (software) incorporated into (set in) a computer as hardware, the computing programs for performing necessary computations for the fluctuation detecting block 70A.

With the fluctuation detecting block 70A according to the embodiment utilizing software, the following arithmetic operations or computations are performed by computing programs:

(1) In accordance with the computing programs, the cut-off frequency on the high frequency side of the pass band frequency of the fluctuation detecting block 70A is set as f1; the cut-off frequency on the low frequency side of the pass band frequency is set as f2; the time constant for noise removal with a value of 1/f1 is set as T1; the time constant for setting the fluctuation detection time with a value of 1/f2 is set as T2; the oscillation coefficient is set as ζ; the setting number is set as α; the gain is set as G; the value obtained by multiplying T11 by α is set as T3; and the value obtained by dividing T2 by α is set as T4.

(2) After completion of the above settings, the fluctuation detecting block 70A performs computations with the use of the computing programs to (2-1) carry out the first order lag filtering of the input signal inputted to the fluctuation detecting block 70A, with the time constant as T3, to determine a first filter signal, (2-2) carry out the first order lag filtering of the input signal inputted to the fluctuation detecting block 70A, with the time constant as T4, to determine a second filter signal, (2-3) subtract the second filter signal from the first filter signal to determine a subtraction signal, (2-4) multiply the subtraction signal by the gain G to determine an amplification signal, (2-4) when the amplification signal is smaller than the predetermined rated value, determine the amplification signal as a fluctuation component, but when the amplification signal becomes equal to or larger than the predetermined rated value, restrict the amplification signal to the rated value and determine it as a fluctuation component, and output the determined fluctuation component as the current command, and (2-5) when the state where the signal value of the amplification signal is restricted to the rated value continues for the predetermined constant time or longer, change the time constant during filtering for determination of the second filter signal to a smaller value than T4, but when the signal value of the amplification signal becomes smaller than the rated value, return the time constant during filtering for determination of the second filter signal to T4.

In the above-described manner, even if the load fluctuations exceed the rating, the execution of an overcompensating action can be prevented.

Embodiment 7

Figure 10:
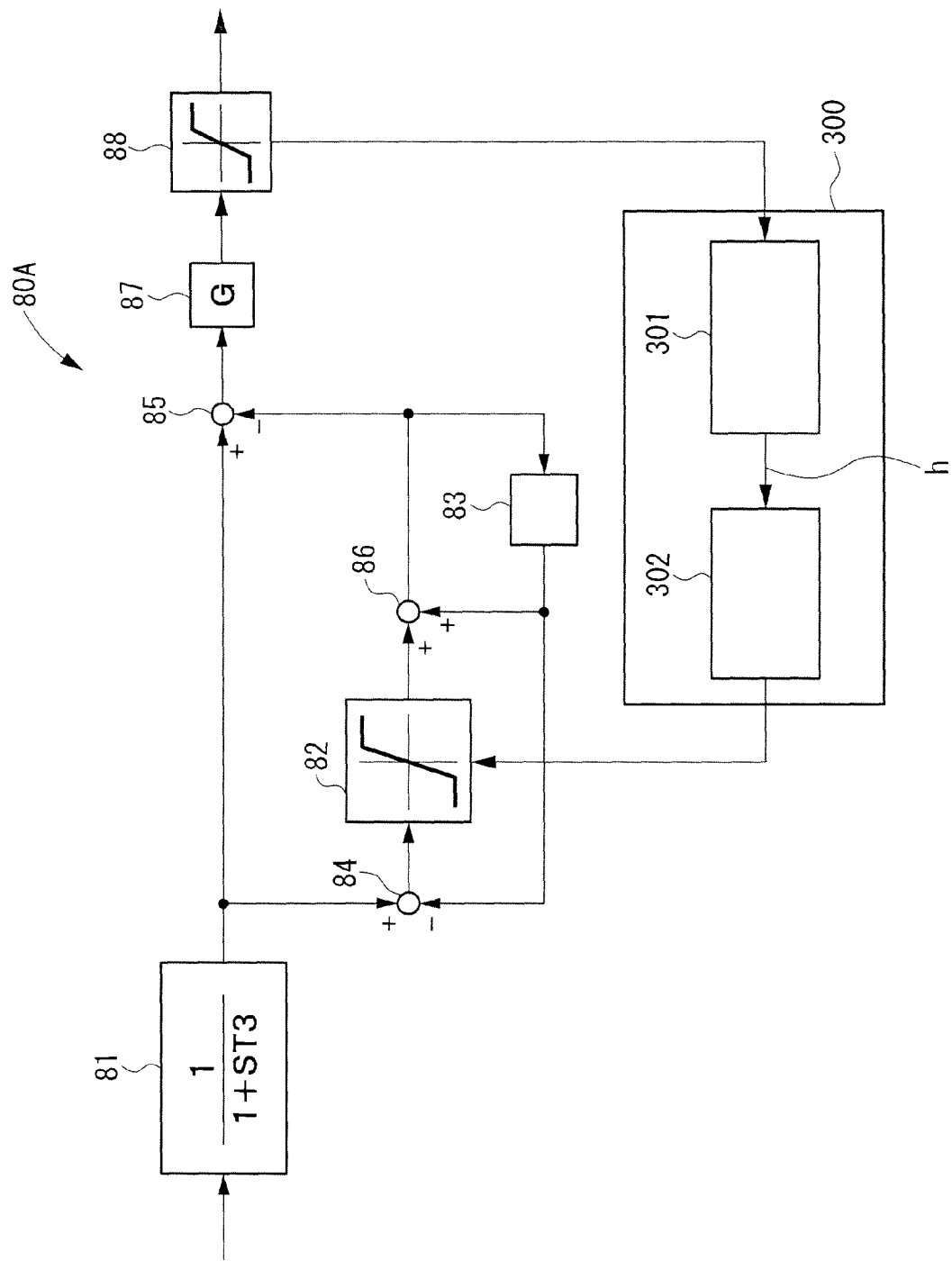
FIG. 10 is a circuit diagram showing a fluctuation detecting block according to Embodiment 7 of the present invention.

FIG. 10 shows a fluctuation detecting block 80A according to Embodiment 7 of the present invention. This fluctuation detecting block 80A has an overcompensation inhibiting unit 300 further added to the configuration of the fluctuation detecting block 80 shown in FIG. 4.

Thus, the overcompensation inhibiting unit 300 will be mainly described, with the same parts as those in the fluctuation detecting block 80 being assigned the same numerals as in the fluctuation detecting block 80, and a duplicate explanation being omitted.

The overcompensation inhibiting unit 300 has a limiter over determination block 301, and a cushioning time changing block 302.

The limiter over determination block 301 is composed of a timer or a digital counter, and detects that the signal value of the fluctuation component signal inputted to the rating limiter 88 has reached a value equal to or more than the rated value (±1 p.u.) set in the rating limiter 88, thus arousing a limiting action, whereby the signal value of the fluctuation component signal outputted from the rating limiter 88 has been limited to the rated value.

Further, the limiter over determination block 301 outputs a cushioning time changing signal h (1) when a timer time during which "a limiting action for allowing the signal value of the fluctuation component signal outputted from the rating limiter 88 to be limited to the rated value (±1 p.u.)" continues lasts for a predetermined constant time or more (in the case of the limiter over determination block 301 being composed of the timer), or (2) when the number of "the limiting actions for allowing the signal value of the fluctuation component signal outputted from the rating limiter 88 to be limited to the rated value (±1 p.u.)" exceeds a predetermined count number (in the case of the limiter over determination block 301 being composed of the digital counter).

If the signal value of the fluctuation component signal inputted to the rating limiter 88 becomes less than the rated value (±1) after outputting of the cushioning time changing signal h, the limiter over determination block 301 stops the outputting of the cushioning time changing signal h and resets the timer time and the count number.

In the absence of the cushioning time changing signal h outputted from the limiter over determination block 301, the cushioning time changing block 302 maintains the cushioning time T5 set in the limiter 82 as such.

In the presence of the cushioning time changing signal h outputted from the limiter over determination block 301, by contrast, the cushioning time changing block 302 changes the cushioning time of the limiter 82 to a smaller value, for example, a tenth of T5.

When outputting of the cushioning time changing signal h from the limiter over determination block 301 is stopped, the cushioning time changing block 302 immediately returns the cushioning time of the limiter 82 to the cushioning time T5.

The control unit 21 is constructed by adopting the fluctuation detecting blocks 80A as the fluctuation detecting blocks 105, 106, 123, 124 shown in FIG. 17. The current characteristics of the distribution system (see FIG. 16) when the load fluctuation became 3 times the rating with the use of the system stabilizing device 20 incorporating the control unit 21 will be described by reference to FIGS. 11(a) to 11(c). These current characteristics are the characteristics during the system-interconnected run.

Figure 11:
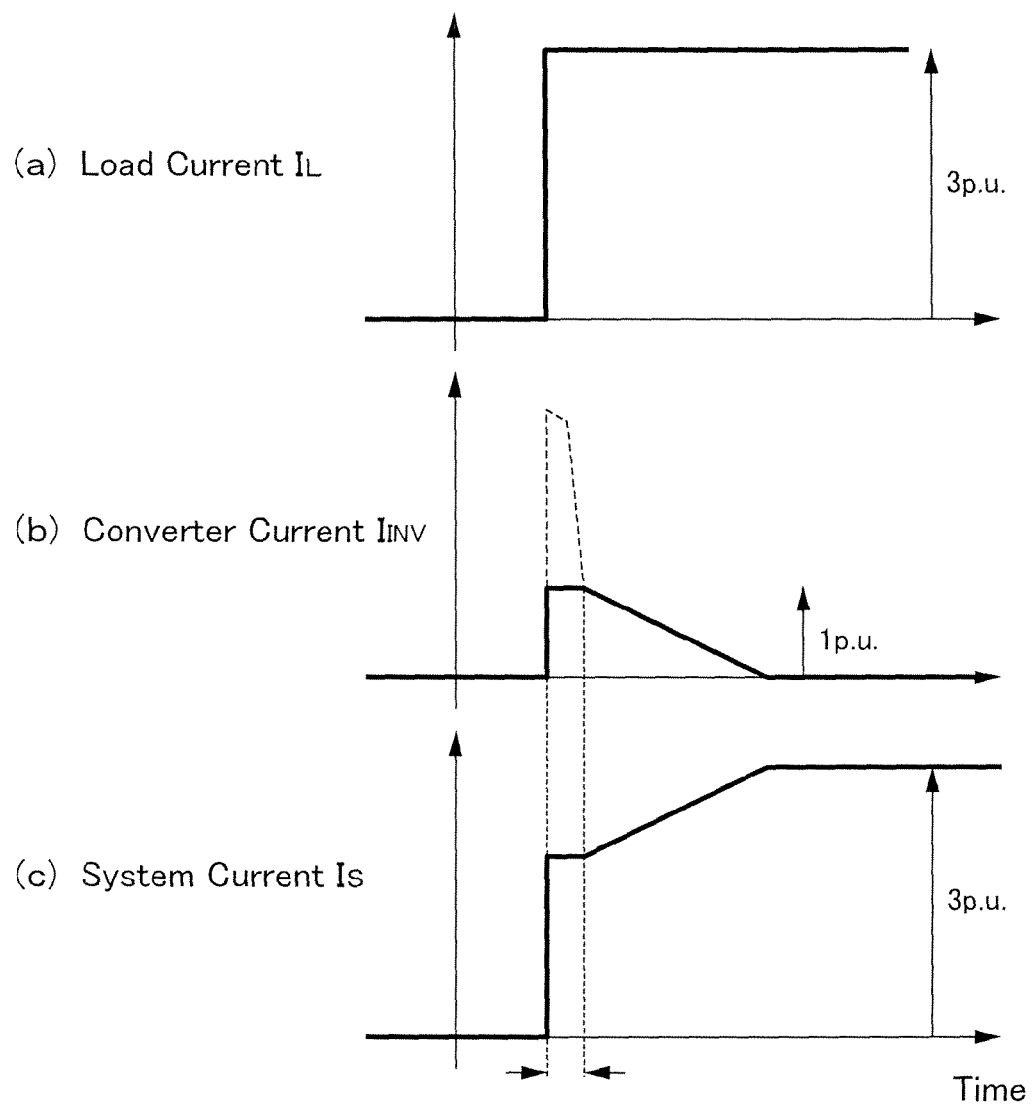
FIGS. 11(a) to 11(c) are characteristic charts showing current characteristics when Embodiment 7 was used.

When the load sharply increases to a value 3 times the rating, whereupon the load current $I_L$ increases stepwise (the current value suddenly changes from 0 to the value 3 times the rating) as shown in FIG. 11(a), the fluctuation component signal inputted to the rating limiter 88 grows beyond the rating. If this state persists for a predetermined constant time or longer, the cushioning time changing signal h is outputted from the limiter over determination block 301, and the cushioning time of the limiter 82 is changed from T5 to ⅒×(T5) by the cushioning time changing block 302.

The cushioning time set in the limiter 82 defines the fluctuation detection time. If this cushioning time is rendered smaller, therefore, the period of time during which the fluctuation component signal inputted to the rating limiter 88 exceeds the rated value can be shortened. In other words, the time during which the fluctuation component signal outputted from the rating limiter 88 remains to be the rated value can be shortened.

Hence, the time during which the converter signal $I_{INV}$ of the rated value is outputted shortens, as indicated by solid lines in FIG. 11(b).

If the cushioning time set in the limiter 82 is rendered small in the above manner, the fluctuation component signal inputted to the rating limiter 88 also decreases. If the fluctuation component signal inputted to the rating limiter 88 falls short of the rated value, the cushioning time changing signal h from the limiter over determination block 301 is stopped, so that the cushioning time of the limiter 82 is returned to T5 by the cushioning time changing block 302.

After the cushioning time returns to T5, therefore, the value of the converter current $I_{INV}$ linearly decreases in accordance with the decrease characteristics defined by the cushioning time T5, as indicated by the solid lines in FIG. 11(b).

After all, the time during which the value of the converter current $I_{INV}$ remains to be the rated value can be shortened. In detail, the value of the converter current $I_{INV}$ keeps the rated value only for a short term, but thereafter, linearly decreases in accordance with the decrease characteristics defined by the cushioning time T5.

As noted above, the value of the converter current $I_{INV}$ outputted as a compensating current assumes the rated value only for a short time after a sharp increase in the load. Afterwards, however, its value linearly decreases in accordance with the decrease characteristics defined by the cushioning time T5. Thus, the system current Is fluctuates narrowly, as shown in FIG. 11(c).

The time during which the converter current $I_{INV}$ takes on the rated value is shortened as above. Thus, power kept charged in the direct current charging unit 23 can be prevented from being wastefully used.

Embodiment 8

Figure 12:
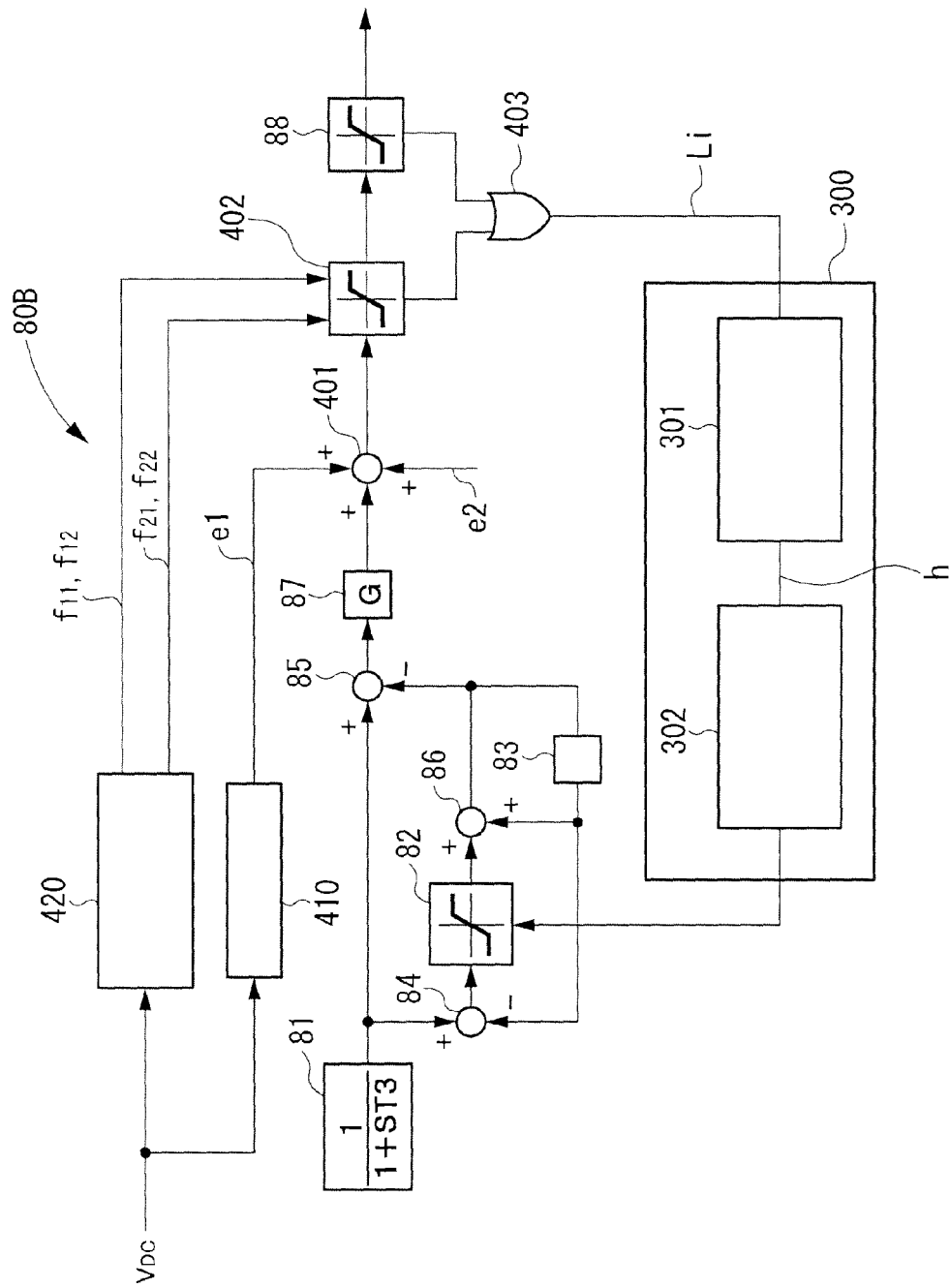
FIG. 12 is a circuit diagram showing a fluctuation detecting block according to Embodiment 8 of the present invention.

FIG. 12 shows a fluctuation detecting block 80B according to Embodiment 8 of the present invention. This fluctuation detecting block 80B has the configuration of the fluctuation detecting block 80A shown in FIG. 10, and other functional structure further added thereto.

Thus, the added other functional structure will be mainly described, with the same parts as those in the fluctuation detecting block 80B being assigned the same numerals as in the fluctuation detecting block 80B, and a duplicate explanation being omitted.

With Embodiment 8, a charge-discharge command e1 for controlling the direct current voltage $V_{DC}$ of the direct current charging unit (electric double layer capacitor) 23 at a constant level, and a current command e2 inputted from outside are added by an adder 401 to the fluctuation component signal outputted from an amplifier 87. The resulting sum signal is passed through a charge-discharge limiter 402, and then inputted to a rating limiter 88.

The charge-discharge command e1 is outputted from a charge-discharge command outputting unit 410. The charge-discharge command outputting unit 410 outputs the charge-discharge command e1 for controlling the direct current voltage $V_{DC}$ of the direct current charging unit (electric double layer capacitor) 23 at the constant level.

The limiting upper limit value and limiting lower limit value of the charge-discharge limiter 402 fluctuate according to the current value limited depending on the residual capacity of the direct current charging unit 23.

That is, in the charge-discharge limiter 402, a limiting upper limit value f11 and a limiting lower limit value f12 are set at the time of charging, and a limiting upper limit value f21 and a limiting lower limit value f22 are set at the time of discharging, according to the residual capacity of the direct current charging unit 23.

The limiting upper limit value f11 and limiting lower limit value f12 during charging, and the limiting upper limit value f21 and limiting lower limit value f22 during discharging are set by a limiting value setting unit 420.

The limiting value setting unit 420 sets the limiting upper limit value f11 and limiting lower limit value f12 during charging, and the limiting upper limit value f21 and limiting lower limit value f22 during discharging, depending on the residual capacity of the direct current charging unit 23.

A logical sum determination unit 403 outputs a limiting action signal Li of the value 1 if the signal inputted to the charge-discharge limiter 402 exceeds the limiting value set in the charge-discharge limiter 402, or if the signal inputted to the rating limiter 88 exceeds the limiting value set in the rating limiter 88.

On the other hand, the logical sum determination unit 403 does not output the limiting action signal Li if the signal inputted to the charge limiter 402 does not exceed the limiting value set in the charge limiter 402 and if the signal inputted to the rating limiter 88 does not exceed the limiting value set in the rating limiter 88.

A limiter over determination block 301 outputs the cushioning time changing signal h when the time of the limiting action signal Li outputted lasts for a predetermined constant time or longer, or when the number of the limiting action signals Li outputted exceeds a predetermined count number.

The constitution of the other parts is the same as that of the fluctuation detecting block 80A shown in FIG. 10.

With this embodiment, the optimal fluctuation component signal can be outputted, with the commands e1, e2 being involved in control and the residual capacity of the direct current charging unit 23 being controlled.

Embodiment 9

Figure 13:
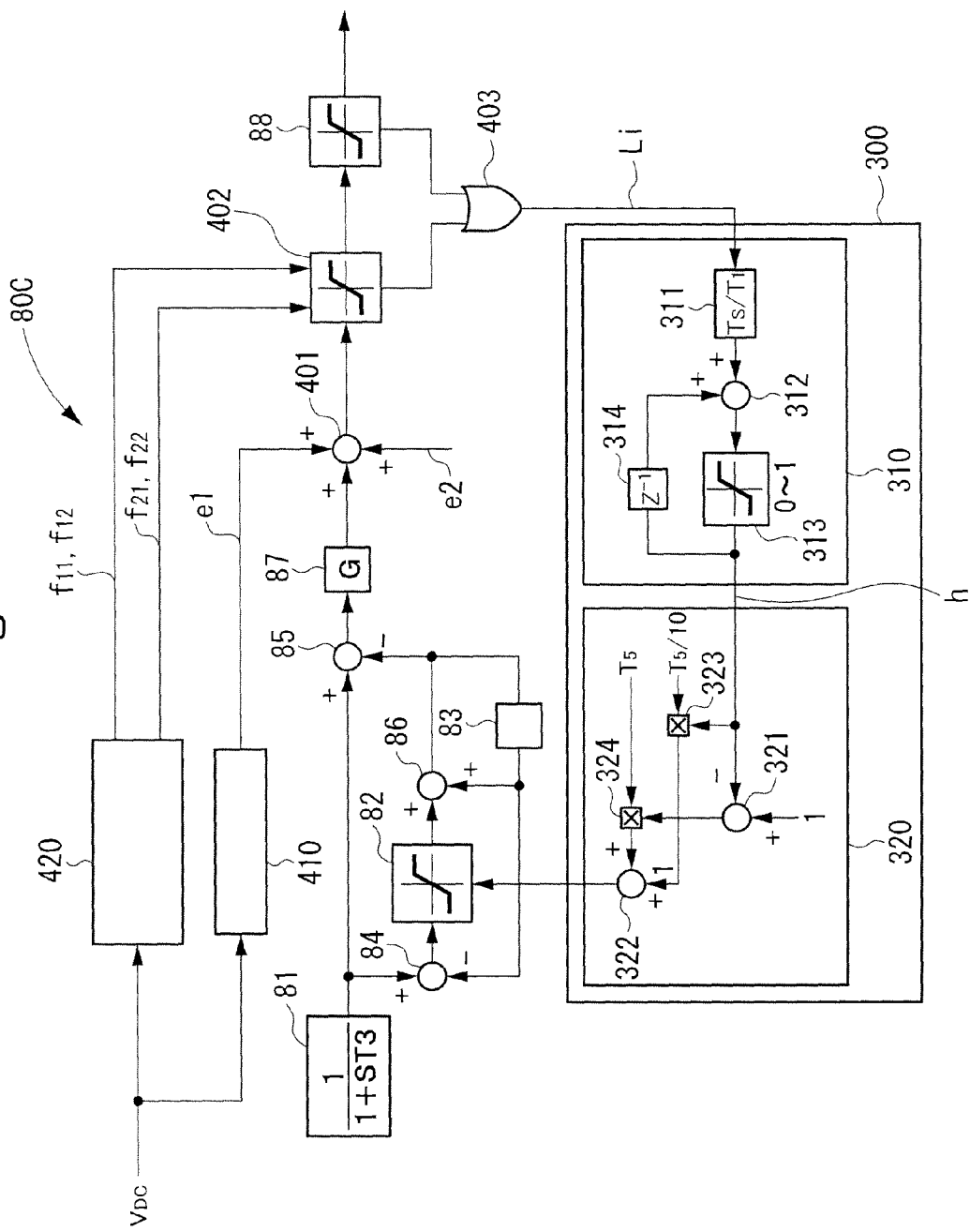
FIG. 13 is a circuit diagram showing a fluctuation detecting block according to Embodiment 9 of the present invention.

FIG. 13 shows a fluctuation detecting block 800 according to Embodiment 9 of the present invention. This fluctuation detecting block 80C has the configuration of the fluctuation detecting block 80B shown in FIG. 12, but in which the actions and functions of the limiter over determination block 301 and the cushioning time changing block 302 have been modified.

A limiter over determination block 310 has a multiplier 311, an adder 312, a limiter 313, and a delay circuit 314, and when receiving a limiting action signal Li, outputs a cushioning time changing signal h whose value gradually increases with the passage of time.

A cushioning time changing block 320 has a subtracter 321, an adder 322, and multipliers 323, 324, and has a time T5 and a time T5/10 set therein.

Upon receipt of the cushioning time changing signal h, the cushioning time changing block 320 gradually changes the cushioning time, which is set in the limiter 82, from T5 to T5/10. When the cushioning time changing signal h is not received, the cushioning time changing block 320 gradually returns the cushioning time, which is set in the limiter 82, from T5/10 to T5.

Figure 14:
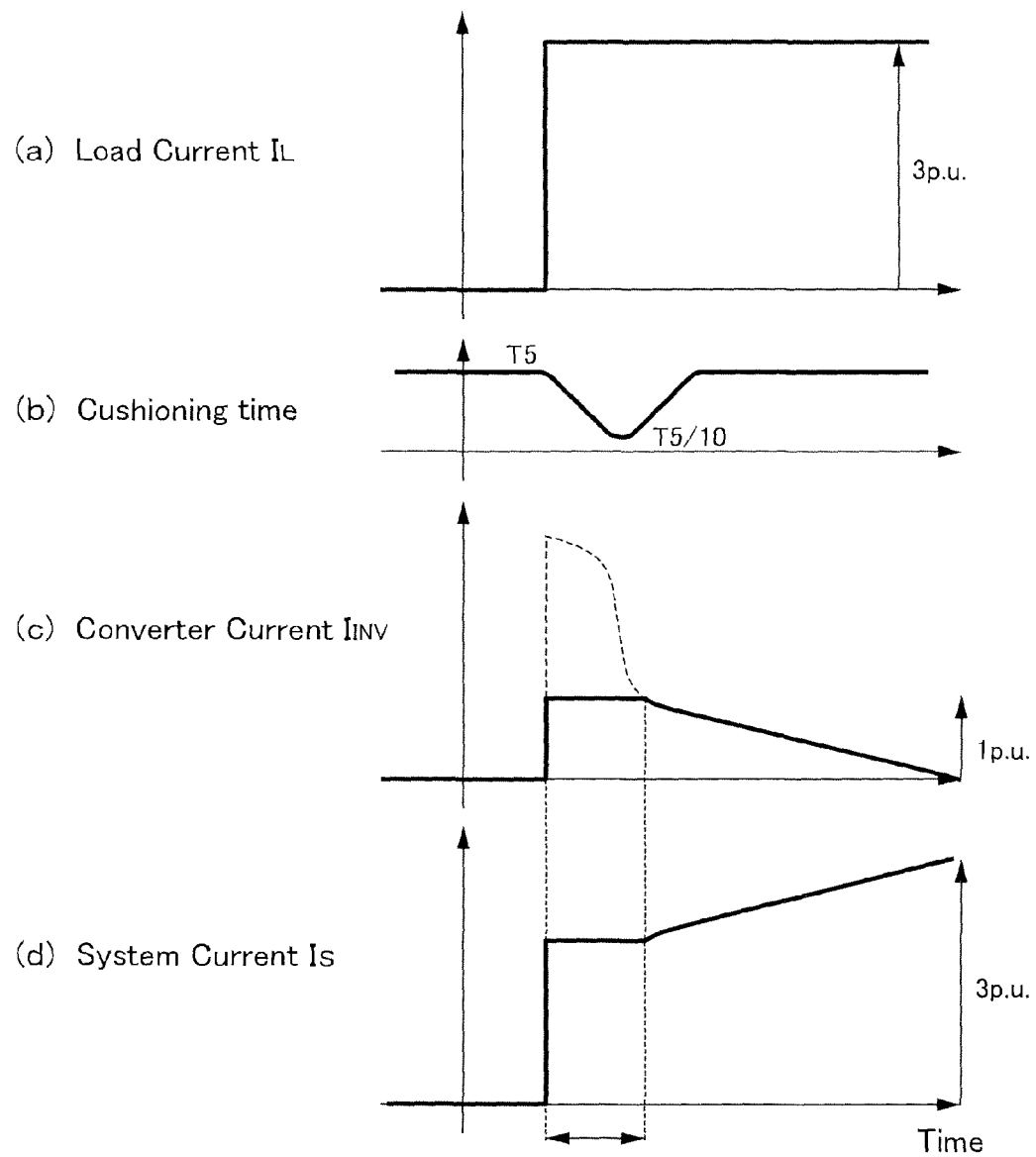
FIGS. 14(a) to 14(d) are characteristic charts showing current characteristics when Embodiment 9 was used.
Figure 15:
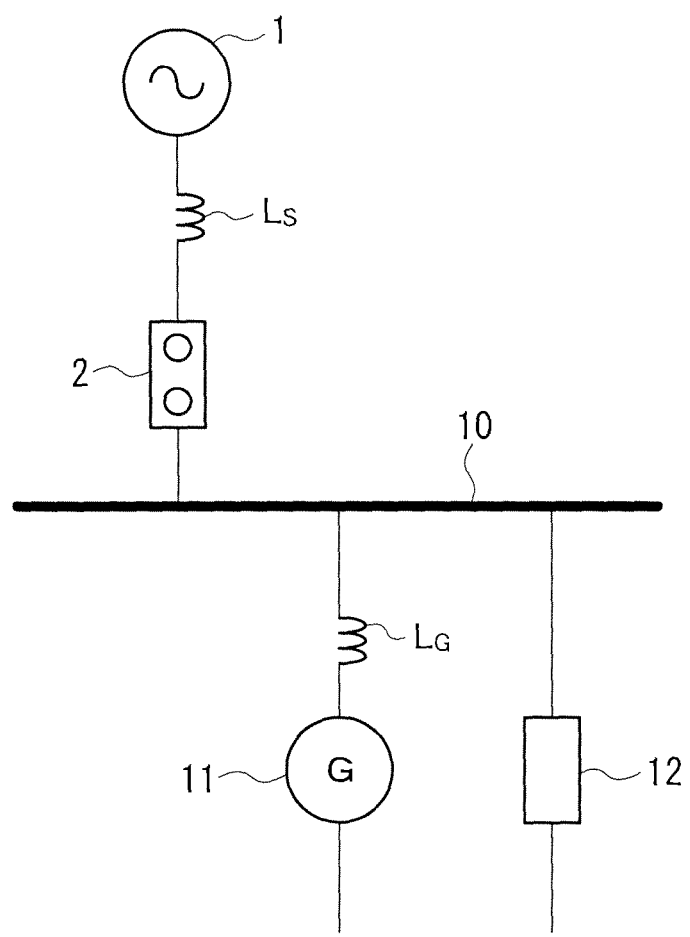
FIG. 15 is a circuit configuration diagram showing a micro grid.

The current characteristics, etc. when the above fluctuation detecting block 80C was used are shown in FIGS. 14(*a*) to 14(*d*). If the load suddenly changes as shown in FIG. 14(*a*), the time during which the converter current $I_{INV}$ takes on the rated value shortens as shown in FIG. 14(*c*), and a disturbance in the system current Is decreases as shown in FIG. 14(*d*).

Moreover, the cushioning time set in the limiter 82 gradually decreases and then gradually returns to the original level, as shown in FIG. 14(*b*).

As described above, mild changes in the actions can prevent adverse influence on other instruments.

Embodiments 7, 8, 9 can also be realized by performing computations using computing programs (software) preset in a computer.

That is, with the embodiments utilizing software, the fluctuation detecting block 80A, 80B, 80C can be constructed as computing programs (software) incorporated into (set in) a computer as hardware, the computing programs for performing necessary computations for the fluctuation detecting block 80A, 80B, 80C.

With the fluctuation detecting block 80A, 80B, 80C according to the embodiments utilizing software, the following arithmetic operations or computations are performed by computing programs:

(1) In accordance with the computing programs, the cut-off frequency on the high frequency side of the pass band frequency of the fluctuation detecting block 80A, 80B, 80C is set as f1; the time constant for noise removal with a value of 1/f1 is set as T1; the oscillation coefficient is set as ζ; the setting number is set as α; the gain is set as G; the value obtained by multiplying T1 by α is set as T3; the cushioning time set at an arbitrary duration is set as T5, one sampling period is set as Ts, and the limiting value is set as X.

(2) After completion of the above settings, the fluctuation detecting block 80A, 80B, 80C performs computations with the use of the computing programs to (2-1) carry out the first order lag filtering of the input signal inputted to the fluctuation detecting block 80A, 80B, 80C, with the time constant as T3, to determine a filter signal, (2-2) subtract the delayed signal from the filter signal to determine a first subtraction signal, (2-3) perform a limiting operation on the first subtraction signal by use of limiting characteristics defined as ±(X/T5)Ts to determine a limit signal, (2-4) add the limit signal and the delayed signal to determine an addition signal, (2-5) delay the addition signal by one sampling period Ts to form the above delayed signal, (2-6) subtract the addition signal from the filter signal to determine a second subtraction signal, (2-7) multiply the second subtraction signal by the gain G to determine an amplification signal, (2-8) when the amplification signal is smaller than the predetermined rated value, determine the amplification signal as a fluctuation component, but when the amplification signal becomes equal to or larger than the predetermined rated value, restrict the amplification signal to the rated value and determine it as a fluctuation component, and output the determined fluctuation component as the current command, and (2-9) when the state where the signal value of the amplification signal is restricted to the rated value continues for the predetermined constant time or longer, change the cushioning time during the limiting operation to a smaller value than T5, but when the signal value of the amplification signal becomes smaller than the rated value, return the cushioning time during the limiting operation to T5.

In the above-described manner, even if the load fluctuations exceed the rating, the execution of an overcompensating action can be prevented.

DESCRIPTION OF THE NUMERALS

1 Power system
2 Circuit breaker
10 Distribution system
11 Dispersed generation plant 12 Load
20 System stabilizing device
21 Control unit
22 Power converter
23 Direct current charging unit
24, 26 Current detector
25 voltage detector
60, 70, 80, 70A, 80A, 80B, 80C Fluctuation detecting block
105, 106, 123, 124 Fluctuation detecting block
200, 300 Overcompensation inhibiting unit
201, 301 Limiter over determination block
202 Time constant changing block
203 Cushioning time changing block

The invention claimed is:

1. A system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detecting block, and uses the first fluctuation component as a first current command for the first active component;

determines a second fluctuation component included in the first reactive component of the system current by a second fluctuation detecting block, and uses the second fluctuation component as a second current command for the first reactive component;

further determines a second active component of a converter current and a second reactive component of the converter current, the converter current being inputted to and outputted from the power converter; and outputs the gate signal for reducing a first current deviation, which is a first deviation between the first current command for the first active component and the second active component of the converter current, to zero, and also reducing a second current deviation, which is a second deviation between the second current command for the first reactive component and the second reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detecting block, and uses the third fluctuation component as a third current command for a third active component;

determines a fourth fluctuation component included in the amplitude signal by a fourth fluctuation detecting block, and uses the fourth fluctuation component as a fourth current command for a third reactive component;

further determines the second active component of the converter current and the second reactive component of the converter current, the converter current being inputted to and outputted from the power converter; and outputs the gate signal for reducing a third current deviation, which is a third deviation between the third current command for the third active component and the second active component of the converter current, to zero, and also reducing a fourth current deviation, which is a fourth deviation between the fourth current command for the third reactive component and the second reactive component of the converter current, to zero, and when a first cut-off frequency on a high frequency side of a pass band frequency of a fluctuation detecting block, is set to be f1, a second cut-off frequency on a low frequency side of the pass band frequency is set to be f2, a first time constant of a first low-pass filter for noise removal which has the first cut-off frequency of f1 is set to be T1, a second time constant of a second low-pass filter for setting a fluctuation detection time which has the second cut-off frequency of f2 is set to be T2, an oscillation coefficient is set to be $\zeta$, a setting number is set to be $\alpha$, a gain is set to be G, a first value obtained by multiplying T1 by $\alpha$ is set to be T3, and a second value obtained by dividing T2 by $\alpha$ is set to be T4, the first fluctuation detection block, the second fluctuation detection block, the third fluctuation detection block, and the fourth fluctuation detection block are each composed of a first filter having first order lag characteristics with a third time constant of T3; a second filter having first order lag characteristics with a fourth time constant of T4; a subtracter which performs subtraction between a first signal outputted from the first filter and a second signal outputted from the second filter and outputs a resulting difference; an amplifier for multiplying an output of the subtracter by the gain G, and outputting a resulting product; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to a rated value and then allows the amplification signal to pass; and an overcompensation inhibiting unit, the oscillation coefficient $\zeta$ expressed by a Formula (01) is set at a third value larger than 1, and the setting number $\alpha$ and the gain G are set using the Formula (01), a Formula (02) and a Formula (03), and $$\zeta = \frac{T1 \cdot \alpha + \frac{T2}{\alpha}}{2\sqrt{T1 T2}} \tag{01}$$

$$\alpha = \frac{2\sqrt{T1 T2} \cdot \zeta \pm \sqrt{4T1 \cdot T2 \cdot \zeta^2 - 4T1 \cdot T2}}{2T1} \tag{02}$$

$$G = \frac{\alpha(T2 - T1)}{T2 - \alpha^2 T1} \tag{03}$$

if a first state where the signal value of the amplification signal is restricted to the rated value by the rating limiter continues for a time equal to or longer than a preset constant time, the overcompensation inhibiting unit changes the fourth time constant of the second filter to a value smaller than T4, but if a second state where the amplification signal passes unchanged through the rating limiter is reached, the overcompensation inhibiting unit returns the fourth time constant of the second filter to T4.

2. A system stabilizing device provided in a distribution system which, when a power system is normal, is connected to the power system, and when an abnormality occurs in the power system, is cut off from the power system, and to which a dispersed generation plant and a load are connected,
the system stabilizing device having a control unit, and a power converter which performs a converting action and an inverting action in accordance with a gate signal fed from the control unit,
wherein when the power system is normal, the control unit
determines a first active component of a system current and a first reactive component of the system current, the system current flowing from the power system into the distribution system;
determines a first fluctuation component included in the first active component of the system current by a first fluctuation detecting block, and uses the first fluctuation component as a first current command for the first active component;
determines a second fluctuation component included in the first reactive component of the system current by a second fluctuation detecting block, and uses the second fluctuation component as a second current command for the first reactive component;
further determines a second active component of a converter current and a second reactive component of the converter current, the converter current being inputted to and outputted from the power converter; and
outputs the gate signal for reducing a first current deviation for the active component, which is a first deviation between the first current command for the first active component and the second active component of the converter current, to zero, and also reducing a second current deviation for the reactive component, which is a second deviation between the second current command for the first reactive component and the second reactive component of the converter current, to zero, and
when the abnormality occurs in the power system, the control unit
determines, from a system voltage of the distribution system, a frequency signal showing a frequency of the system voltage and an amplitude signal showing an amplitude of the system voltage;
determines a third fluctuation component included in the frequency signal by a third fluctuation detecting block, and uses the third fluctuation component as a third current command for a third active component;
determines a fourth fluctuation component included in the amplitude signal by a fourth fluctuation detecting block, and uses the fourth fluctuation component as a fourth current command for a third reactive component;
further determines the second active component of the converter current and the second reactive component of the converter current, the converter current being inputted to and outputted from the power converter; and
outputs the gate signal for reducing a third current deviation, which is a third deviation between the third current command for the third active component and the second active component of the converter current, to zero, and also reducing a fourth current deviation, which is a fourth deviation between the fourth current command for the third reactive component and the second reactive component of the converter current, to zero, and when a first cut-off frequency on a high frequency side of a pass band frequency of a fluctuation detecting block, is set to be f1, a second cut-off frequency on a low frequency side of the pass band frequency is set to be f2, a first time constant of a first low-pass filter for noise removal which has the first cut-off frequency of f1 is set to be T1, a second time constant of a second low-pass filter for setting a fluctuation detection time which has a the second cut-off frequency of f2 is set to be T2, an oscillation coefficient is set to be $\zeta$, a setting number is set to be $\alpha$, a gain is set to be G, a first value obtained by multiplying T1 by $\alpha$ is set to be T3, and a second value obtained by dividing T2 by $\alpha$ is set to be T4, blocks the first fluctuation detection block, the second fluctuation detection block, the third fluctuation detection block, and the fourth fluctuation detection block are each composed of a first filter having first order lag characteristics with a third time constant of T3; a second filter having first order lag characteristics with a fourth time constant of T4; a subtracter which performs subtraction between a first signal outputted from the first filter and a second signal outputted from the second filter and outputs a resulting difference; an amplifier for multiplying an output of the subtracter by the gain G, and outputting a resulting product; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to a rated value and then allows the amplification signal to pass; and an overcompensation inhibiting unit,
the gain G is set at an arbitrary value, the setting number $\alpha$ is set using a Formula (04), and the oscillation coefficient $\zeta$ is set at, $\zeta=[T1\cdot\alpha+(T2/\alpha)]/[2(T1\cdot T2)^{1/2}]$, and $$\alpha = \frac{-(T2-T1) \pm \sqrt{(T2-T1)^2 + 4G^2 \cdot T1 \cdot T2}}{2T1 \cdot G} \quad (04)$$

if a first state where the signal value of the amplification signal is restricted to the rated value by the rating limiter continues for a time equal to or longer than a preset constant time, the overcompensation inhibiting unit changes the fourth time constant of the second filter to a value smaller than T4, but if a second state where the amplification signal passes unchanged through the rating limiter is reached, the overcompensation inhibiting unit returns the fourth time constant of the second filter to T4.

3. The system stabilizing device according to claim 1, wherein
in each of the first fluctuation detection block, the second fluctuation detection block, the third fluctuation detection block, and the fourth fluctuation detection block,
the first cut-off frequency on the high frequency side of the pass band frequency of the fluctuation detecting block, is set as f1, the second cut-off frequency on the low frequency side of the pass band frequency is set as f2, the first time constant for noise removal with the first cut-off frequency of 1/f1 is set as T1, the second time constant for setting the fluctuation detection time with the second cut-off frequency of 1/f2 is set as T2, the oscillation coefficient is set as $\zeta$, the setting number is set as $\alpha$, the gain is set as G, the first value obtained by multiplying T1 by α is set as T3, and the second value obtained by dividing T2 by α is set as T4, and first fluctuation detection block, the second fluctuation detection block, the third fluctuation detection block, and the fourth fluctuation detection block, each perform computations with use of computing programs to carry out first order lag filtering of an input signal inputted to the fluctuation detecting block, with the third time constant as T3, to determine a first filter signal, carry out first order lag filtering of the input signal inputted to the fluctuation detecting block, with the fourth time constant as T4, to determine a second filter signal, subtract the second filter signal from the first filter signal to determine a subtraction signal, multiply the subtraction signal by the gain G to determine the amplification signal, when the amplification signal is smaller than a predetermined rated value, determine the amplification signal as a fluctuation component, but when the amplification signal is equal to or larger than the predetermined rated value, restrict the amplification signal to the rated value, determine a restricted signal as the fluctuation component, and output a determined fluctuation component as a current command, and if the first state where the signal value of the amplification signal is restricted to the rated value continues for the time equal to or longer than a predetermined constant time, change the fourth time constant of the second filter to the value smaller than T4, but if the second state where the signal value of the amplification signal is smaller than the rated value is reached, return the fourth time constant of the second filter to T4.

4. A system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detecting block, and uses the first fluctuation component as a first current command for the first active component;

determines a second fluctuation component included in the first reactive component of the system current by a second fluctuation detecting block, and uses the second fluctuation component as a second current command for the first reactive component;

further determines a second active component of a converter current and a second reactive component of the converter current, the converter current being inputted to and outputted from the power converter; and outputs the gate signal for reducing a first current deviation, which is a first deviation between the first current command for the first active component and the second active component of the converter current, to zero, and also reducing a second current deviation, which is a second deviation between the second current command for the first reactive component and the second reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detecting block, and uses the third fluctuation component as a third current command for a third active component;

determines a fourth fluctuation component included in the amplitude signal by a fourth fluctuation detecting block, and uses the fourth fluctuation component as a fourth current command for a third reactive component;

further determines the second active component of the converter current and the second reactive component of the converter current, the converter current being inputted to and outputted from the power converter; and outputs the gate signal for reducing a third current deviation, which is a third deviation between the third current command for the third active component and the second active component of the converter current, to zero, and also reducing a fourth current deviation, which is a fourth deviation between the fourth current command for the third reactive component and the second reactive component of the converter current, to zero, and when a first cut-off frequency on a high frequency side of a pass band frequency of a fluctuation detecting block, is set to be f1, a first time constant of a first low-pass filter for noise removal which has the first cut-off frequency of f1 is set to be T1, an oscillation coefficient is set as ζ, a setting number is set as α, a gain is set as G, a first value obtained by multiplying T1 by α is set to be T3, a cushioning time set at an arbitrary time is set to be T5, one sampling period is set to be Ts, and a limiting value is set as x, the first fluctuation detection block, the second fluctuation detection block, the third fluctuation detection block, and the fourth fluctuation detection block each have a filter having first order lag characteristics with a third time constant of T3; a limiter having limiting characteristics defined as ±(x/T5)Ts; a delay circuit for delaying an inputted signal by one sampling period Ts and outputting a delayed signal; a first subtracter; a second subtracter; an adder; an amplifier; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to a rated value and then allows the amplification signal to pass; and an overcompensation inhibiting unit, the first subtracter subtracts a first signal outputted from the delay circuit from a second signal outputted from the filter having the first order lag characteristics, and feeds a first resulting difference to the limiter, the adder adds a third signal outputted from the limiter and the first signal outputted from the delay circuit, and outputs a resulting sum, the delay circuit delays a fourth signal outputted from the adder by one sampling period Ts, and outputs the delayed signal, the second subtracter subtracts the fourth signal outputted from the adder from the second signal outputted from the filter having the first order lag characteristics, and outputs a second resulting difference to the amplifier, the amplifier multiplies an output of the second subtracter by the gain G, and outputs a resulting product, and the oscillation coefficient ζ expressed by a Formula (01) is set at a third value larger than 1, and the setting number α and the gain G are set using the Formula (01), a Formula (02) and a Formula (03), and $$\zeta = \frac{T1 \cdot \alpha + \frac{T2}{\alpha}}{2\sqrt{T1T2}} \quad (01)$$

$$\alpha = \frac{2\sqrt{T1T2} \cdot \zeta \pm \sqrt{4T1 \cdot T2 \cdot \zeta^2 - 4T1 \cdot T2}}{2T1} \quad (02)$$

$$G = \frac{\alpha(T2 - T1)}{T2 - \alpha^2 T1} \quad (03)$$

if a first state where the signal value of the amplification signal is restricted to the rated value by the rating limiter continues for a time equal to or longer than a predetermined constant time, the overcompensation inhibiting unit changes the cushioning time of the limiter to a value smaller than T5, but if a second state where the amplification signal passes unchanged through the rating limiter is reached, the overcompensation inhibiting unit returns the cushioning time of the limiter to T5.

5. A system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines a first active component of a system current and a first reactive component of the system current, the system current flowing from the power system into the distribution system;

determines a first fluctuation component included in the first active component of the system current by a first fluctuation detecting block, and uses the first fluctuation component as a first current command for the first active component;

determines a second fluctuation component included in the first reactive component of the system current by a second fluctuation detecting block, and uses the second fluctuation component as a second current command for the first reactive component;

further determines a second active component of a converter current and a second reactive component of the converter current, the converter current being inputted to and outputted from the power converter; and outputs the gate signal for reducing a first current deviation, which is a first deviation between the first current command for the first active component and the second active component of the converter current, to zero, and also reducing a second current deviation, which is a second deviation between the second current command for the first reactive component and the second reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a third fluctuation component included in the frequency signal by a third fluctuation detecting block, and uses the third fluctuation component as a third current command for a third active component;

determines a fourth fluctuation component included in the amplitude signal by a fourth fluctuation detecting block, and uses the fourth fluctuation component as a fourth current command for a third reactive component;

further determines the second active component of the converter current and the second reactive component of the converter current, the converter current being inputted to and outputted from the power converter; and outputs the gate signal for reducing a third current deviation, which is a third deviation between the third current command for the third active component and the second active component of the converter current, to zero, and also reducing a fourth current deviation, which is a fourth deviation between the fourth current command for the third reactive component and the second reactive component of the converter current, to zero, and when a first cut-off frequency on a high frequency side of a pass band frequency of a fluctuation detecting block is set to be f1, a first time constant of a first low-pass filter for noise removal which has the first cut-off frequency of f1 is set to be T1, an oscillation coefficient is set as ζ, a setting number is set as α, a gain is set as G, a first value obtained by multiplying T1 by α is set to be T3, a cushioning time set at an arbitrary time is set to be T5, one sampling period is set to be Ts, and a limiting value is set as x first fluctuation detection block, the second fluctuation detection block, the third fluctuation detection block, and the fourth fluctuation detection block each have a filter having first order lag characteristics with a third time constant of T3; a limiter having limiting characteristics defined as ±(x/T5)Ts; a delay circuit for delaying an inputted signal by one sampling period Ts and outputting a delayed signal; a first subtracter; a second subtracter; an adder; an amplifier; a rating limiter which, when an amplification signal outputted from the amplifier is smaller than a preset rated value, allows the amplification signal to pass unchanged, but when the amplification signal is equal to or larger than the preset rated value, restricts a signal value of the amplification signal to a rated value and then allows the amplification signal to pass; and an overcompensation inhibiting unit, the first subtracter subtracts a first signal outputted from the delay circuit from a second signal outputted from the filter having the first order lag characteristics, and feeds a first resulting difference to the limiter, the adder adds a third signal outputted from the limiter and the first signal outputted from the delay circuit, and outputs a resulting sum, the delay circuit delays a fourth signal outputted from the adder by one sampling period Ts, and outputs the delayed signal, the second subtracter subtracts the fourth signal outputted from the adder from the second signal outputted from the filter having the first order lag characteristics, and outputs a second resulting difference to the amplifier, the amplifier multiplies an output of the second subtracter by the gain G, and outputs a resulting product, and the gain G is set at an arbitrary value, the setting number α is set using a Formula (04), and the oscillation coefficient ζ is set at, and $$\alpha = \frac{-(T2-T1) \pm \sqrt{(T2-T1)^2 + 4G^2 \cdot T1 \cdot T2}}{2T1 \cdot G} \quad (04)$$

if a first state where the signal value of the amplification signal is restricted to the rated value by the rating limiter continues for a time equal to or longer than a predetermined constant time, the overcompensation inhibiting unit changes the cushioning time of the limiter to a value smaller than T5, but if a second state where the amplification signal passes unchanged through the rating limiter is reached, the overcompensation inhibiting unit returns the cushioning time of the limiter to T5.

6. The system stabilizing device according to claim 4, wherein in each of the first fluctuation detection block, the second fluctuation detection block, the third fluctuation detection block, and the fourth fluctuation detection block, the first cut-off frequency on the high frequency side of the pass band frequency of the fluctuation detecting block is set as f1, the first time constant for noise removal with a value the first cut-off frequency of 1/f1 is set as T1, the oscillation coefficient is set as ζ, the setting number is set as α, the gain is set as G, the first value obtained by multiplying T1 by α is set as T3, the cushioning time set at the arbitrary time is set as T5, the one sampling period is set as Ts, and the limiting value is set as x, and the first fluctuation detection block, the second fluctuation detection block, the third fluctuation detection block, and the fourth fluctuation detection block each perform computations with use of computing programs to carry out first order lag filtering of an input signal inputted to the fluctuation detecting block, with the third time constant as T3, to determine a filter signal, subtract the delayed signal from the filter signal to determine a first subtraction signal, perform a limiting operation on the first subtraction signal by the limiting characteristics defined as ±(x/T5)Ts to determine a limit signal, add the limit signal and the delayed signal to determine an addition signal, delay the addition signal by the one sampling period Ts to form the delayed signal, subtract the addition signal from the filter signal to determine a second subtraction signal, and multiply the second subtraction signal by the gain G to determine the amplification signal, when the amplification signal is smaller than a predetermined rated value, determine the amplification signal as a fluctuation component, but when the amplification signal is equal to or larger than the predetermined rated value, restrict the amplification signal to the rated value, determine a restricted signal as the fluctuation component, and output a determined fluctuation component as a current command, and if the first state where the signal value of the amplification signal is restricted to the rated value continues for the time equal to or longer than the predetermined constant time, change the cushioning time of the limiter to the value smaller than T5, but if the second state where the signal value of the amplification signal is smaller than the rated value is reached, return the cushioning time of the limiter to T5.

* * * * *